(12) United States Patent
Azvine et al.

(10) Patent No.: US 7,007,067 B1
(45) Date of Patent: Feb. 28, 2006

(54) APPARATUS FOR PROCESSING COMMUNICATIONS

(75) Inventors: Benham Azvine, Ipswich (GB); David Philippe Djian, Ipswich (GB); Kwok Ching Tsui, Colchester (GB); Wayne Raymond Wobcke, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/806,696

(22) PCT Filed: Nov. 2, 1999

(86) PCT No.: PCT/GB99/03603

§ 371 (c)(1),
(2), (4) Date: Apr. 4, 2001

(87) PCT Pub. No.: WO00/26827

PCT Pub. Date: May 11, 2000

(30) Foreign Application Priority Data

Nov. 3, 1998 (EP) .................................. 98308990
Nov. 3, 1998 (GB) .................................. 9824033

(51) Int. Cl.
*G06F 15/16* (2006.01)

(52) U.S. Cl. ............... 709/206; 709/202; 709/204; 709/207; 709/223; 709/224; 709/230; 715/500; 715/526

(58) Field of Classification Search ................ 709/202, 709/204, 206, 207, 224, 223, 230; 715/500, 715/526
See application file for complete search history.

(56) References Cited

U.S. PATENT DOCUMENTS

| 5,765,178 A | 6/1998 | Tanaka ...................... 715/526 |
| 6,052,709 A * | 4/2000 | Paul .......................... 709/202 |
| 6,094,681 A * | 7/2000 | Shaffer et al. .............. 709/224 |

FOREIGN PATENT DOCUMENTS

| EP | 0 420 779 A | 3/1991 |
| WO | 97 40447 A | 10/1997 |

OTHER PUBLICATIONS

Cohen, "Learning Rules that Classify E-Mail", AT&T Laboratories, XP-00208114910/16/98.
Takkinen et al, "CAFÉ: A Conceptual Model for Managing Information in Electronic Mail", Laboratory for Intelligent Information Systems (IISLAB), XP-000885829, 1998.
Boone G.; "Concept features in Re.: Agent, and intellignet email agent"; Database INSPEC Online!; Institute of Electrical Engineers, Stevenage, GB; XP002099560.

(Continued)

*Primary Examiner*—Ario Etienne
*Assistant Examiner*—Yves Dalencourt
(74) *Attorney, Agent, or Firm*—Nixon & Vanderhye P.C.

(57) ABSTRACT

Communications received by a user over a communications link include identification information and are processed by:
extracting identification information associated with a first received communication;
categorizing the first communication and recommending an action based on the categorization;
monitoring user response to the first communication;
modifying the categorization in accordance with a monitored user response to the first communication, such that when a second communication having identifying information matching that of the first communication is received, the monitored user response is recommended by the categorization.

19 Claims, 29 Drawing Sheets

OTHER PUBLICATIONS

Diederich J. et al., "Recurrent and feedforward networks for human-computer interaction"; Databse INSPEC Online!; Institute of Electrical Engineers, Stevenage, GB; Inspec No. 4508920; XP002099561.

Cohen W W,; "Learning Rules that classify E-mail"; Machine Learning in Information Access Papers from the AAAI Symposium, Technical Report, May 1, 1996; pp 1-8, Internet Complete; XP002081149.

* cited by examiner

| Time (am) | Fuzzy ranking |
|-----------|---------------|
| 8.00 | 0.75 |
| 8.30 | 1.0 |
| 9.00 | 0.5 |
| 9.30 | 0.25 |

Early morning

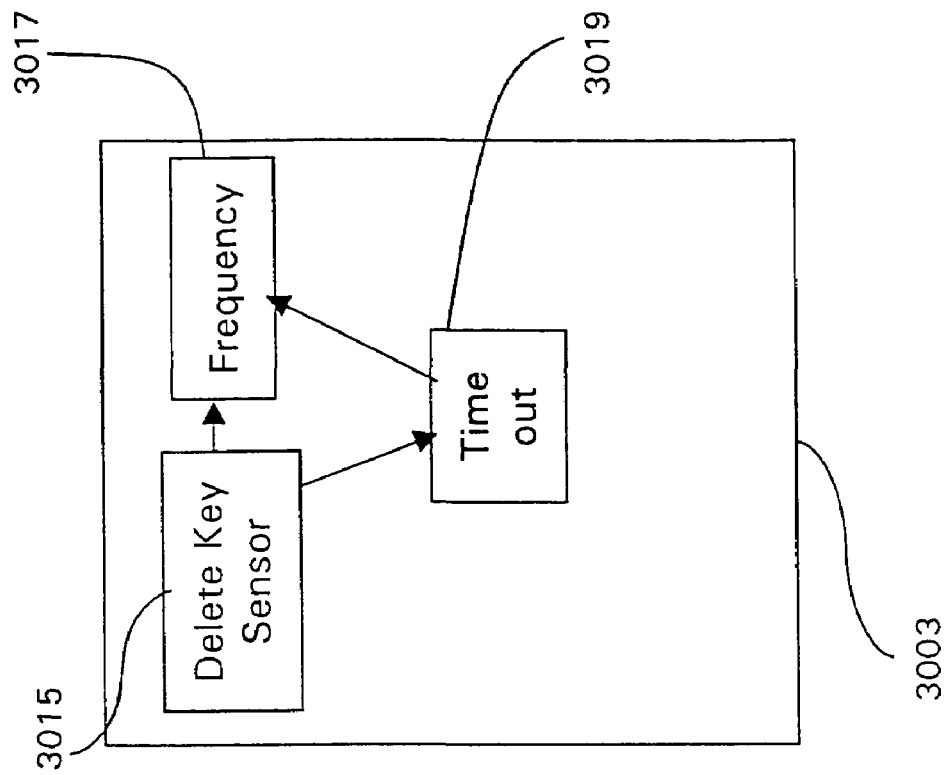
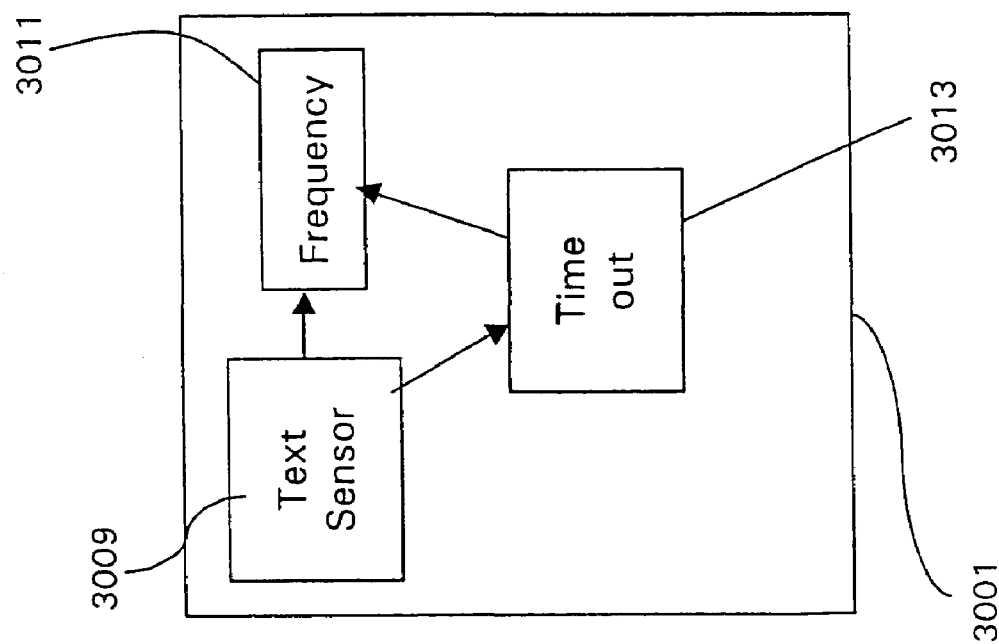
Fig 30

APPARATUS FOR PROCESSING COMMUNICATIONS

BACKGROUND OF THE INVENTION

1. Field of the Invention

The invention relates to apparatus and method for processing communications, suitable particularly but not exclusively for assisting in the management of information flows for a user.

2. Related Art

Modern computers are multifunctional devices that enable a user to process data not only from a local source but also from remote sources connected through local area networks and wide area networks such as the internet. The user can send and receive emails and generally use the computer as a workstation from which many different day-to-day tasks can be performed.

There are several journal publications that present various methods of filtering email messages, with the goal of reducing the cognitive load on the user. One such method has been described in "CAFE: a conceptual model for managing information in electronic mail", XP000775829, where messages are routed into folders using a naïve Bayes classifier. The system filters the messages based on information in the 'subject', and 'from' fields and learns how to filter messages into various folders based on this information. Publication XP002099560, "Concept features in Re: Agent, an intelligent agent", reviews various algorithms that are used for extracting information from the text of an email, which information is subsequently used to filter incoming emails based on the substance contained therein. Publication XP002099561, "Recurrent and feed-forward networks for human-computer interaction", teaches the use of neural networks to extract information from a message, to learn how a user responds to that information, and to propose system actions upon receipt of subsequent emails. These actions may include displaying the message, saving the message, and initiating a reply window etc. Publication XP002081149, "Learning the rules that classify email", compares various methods that may be used to learn rules for classifying emails, which can then be used to form message and mailbox categories. The classification includes classifying the sender, and the text within the message, and uses a Bayes net to represent a causal relationship between subject matter and the rules learnt therefrom. In all of these cases, the focus is on extracting text from the content and/or subject of emails, and using this text to classify the emails in some way.

BRIEF SUMMARY OF THE INVENTION

In accordance with the present invention there is provided apparatus for processing communications received by a user over a communications link, which communications include identification information, the apparatus comprising:
 (i) an input for communications;
 (ii) extracting means for extracting identification information associated with a first communication received at the input;
 (iii) categorising means for categorising the first communication and recommending an action based on the categorisation;
 (iv) means for monitoring user response to the first communication; and
 (v) modifying means for modifying the categorising means in accordance with a monitored user response to the first communication, such that when a second communication having identifying information matching that of the first communication is received, the monitored user response is recommended by the categorising means.

Advantageously the apparatus further comprises a diary for logging availability status with respect to a user, said categorising means being triggered by a received communication to review a user's availability status and to base a recommended response with respect to the received communication at least in part on said availability status.

Communications received in the context of the present invention generally include email and telephone communications, and the identification data of these communications includes information concerning the sender, destination address and subject.

Extracting means in this context is generally referred to as a logical sensor, such as a Boolean sensor, and a Bayes Net arrangement is used to refer to the categorising means. The means for monitoring user response and the modifying means of the present invention are generally described by their functionality. Availability status is generally referred to as whether the user is interruptible or not, as a function of settings selected by the user or inputs from software agents that interface with the present invention.

BRIEF DESCRIPTION OF THE DRAWINGS

Further aspects, features and advantages of apparatus for processing communications will now be described, by way of example only, as an embodiment of the present invention, with reference to the accompanying drawings, in which:

FIG. 20 is a schematic block diagram showing implementation features relating to the email assistant shown in FIG. 2;

FIG. 30 is a block diagram showing means for detecting use of low level inputs for monitoring stress levels according to the process shown in FIG. 29.

DETAILED DESCRIPTION OF EXEMPLARY EMBODIMENTS

Overview

Figure 1:
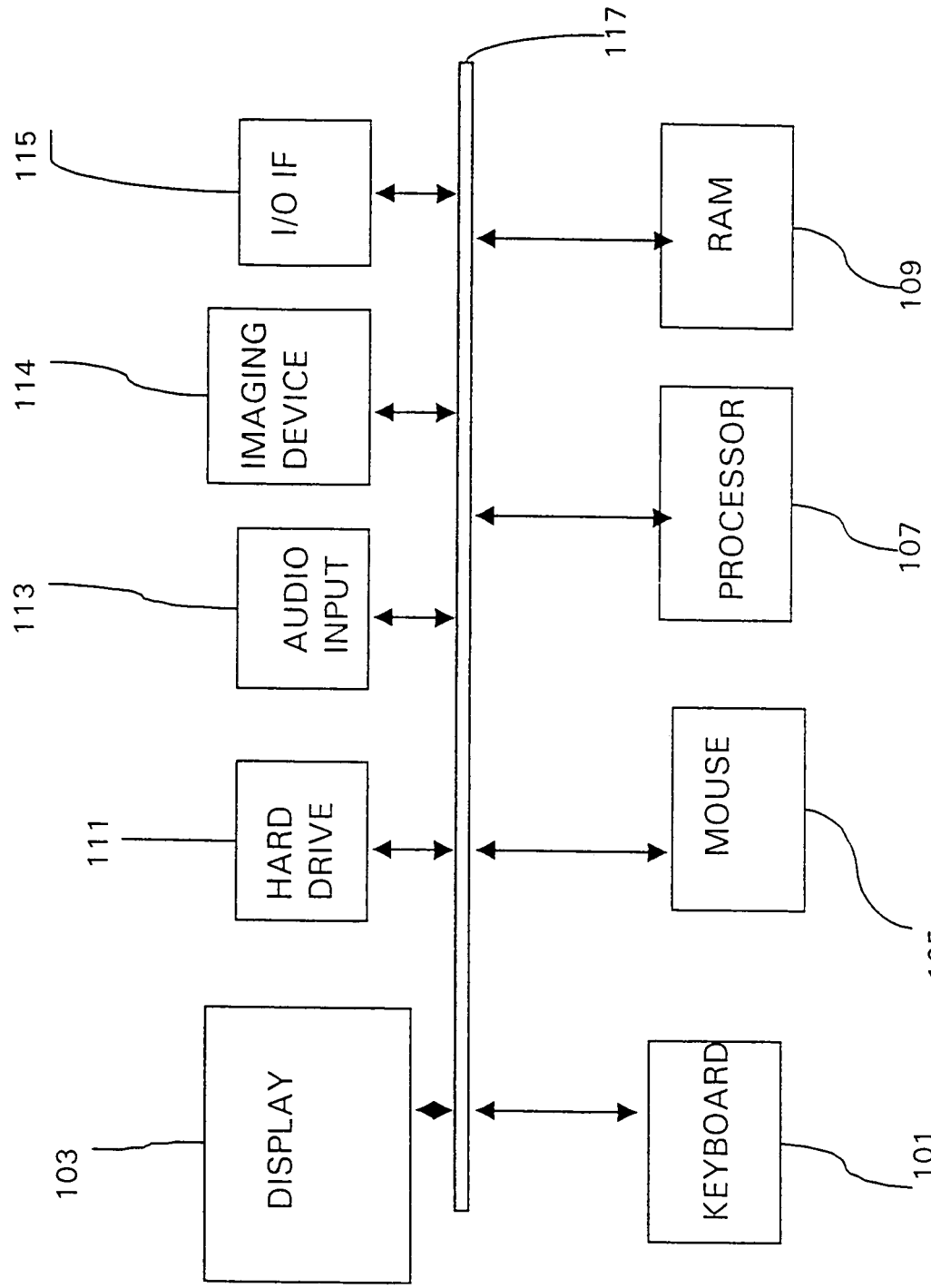
FIG. 1 is a schematic block diagram of the hardware of a computer system configured to run apparatus for co-ordinating tasks of the present invention.

FIG. 1 shows a generally conventional computer system 100 that comprises: a conventional keyboard 101; a display screen 103, such as a CRT or plasma screen; a mouse 105; a processor 107 such as a Pentium™ processor; random access memory 109; a hard disc drive 111; an audio input 113 such as a microphone to detect utterances from the user; an imaging device 114, such as a gaze tracker or video camera; and input/output interfaces 115 to connect the workstation to a local area network (LAN) and wider area networks (WAN) such as the internet, to facilitate data exchange including email messaging with remote users connected to such networks. The interface 115 also allows control of a plain old telephone set (POTS) and the components shown in FIG. 1 are interconnected by a common bus 117. In addition to the single system configuration shown in FIG. 1, several computer systems (not shown) may be interconnected over a local area network via the input/output interface 115.

In a conventional manner, the processor 107 runs programs held on hard disc memory 111, making use of RAM 109, under the control of keyboard 101 and mouse 105, together with imaging device 114 to provide data on the display 103. Audio inputs can be made through the audio input 113 for use by speech recognition software. The arrangement can thus provide the usual database, word-processing and spreadsheet functionality associated with a personal computer by the use of conventional software packages stored on the hard disc memory 111. Access to a printer (not shown) may be provided.

Figure 2:
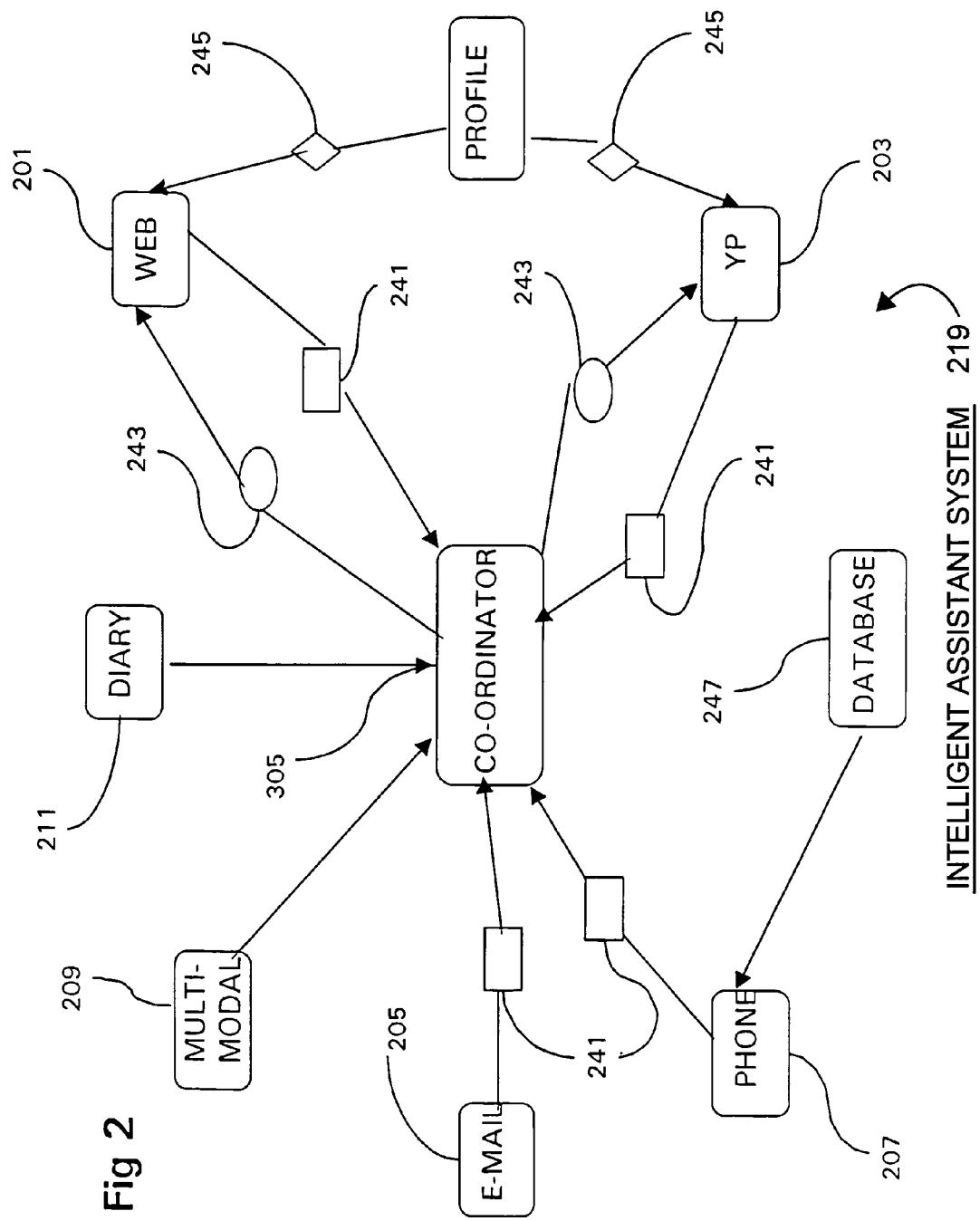
FIG. 2 is a schematic diagram showing apparatus for co-ordinating tasks interacting with a plurality of intelligent agents according to the present invention.

Referring also to FIG. 2, apparatus 305 for co-ordinating tasks to be executed by a computer system 100 may be stored on the hard disc drive 111 for processing by the processor 107. The apparatus 305 may be part of an intelligent assistant system 219 which enables users to devote their time to highly complex tasks while the system 219 takes some decisions on behalf of the user based on previous observations of the user, thus enabling the user to increase productivity. Typical tasks to be performed by the system include time, information and communication management. When the computer system comprises several computer workstations, interconnected via the input/output interface 115, several intelligent assistant systems 219 may be active and may communicate with one another. In the context of the present invention, a "user" is not necessarily limited to a human entity, as it might well be another piece of equipment or a software agent.

As shown in FIG. 2, such a system 219 may additionally comprise a set of autonomous systems 201, 203, 205, 207, 209, 211, generally referred to as agents or assistants, specialising in various tasks such as diary management, telephone call filtering and email prioritisation, web search and telephone directory enquiry:

System 211 comprises a diary assistant, which, as will be explained in more detail later, assists the user to make diary entries using fuzzy reasoning techniques;

System 209 comprises a multi-modal interface to facilitate entry of data in a number of modalities. The module 209 may be configured as described in British Telecom Technical Journal (BTTJ) Vol. 16, No. 3, July 1998, K. C. Tsui et al, "Intelligent Multimodal Systems," pp 134–144.

System 247 comprises a database that may contain names and contact details of associates of the user, along with a user profile comprising user preference parameters, which can be accessed by the other systems 201, 203, 205, 207, 209, 211;

System 203 comprises an assistant for interrogating and processing data from a classified telephone directory service such as Talking Pages™, as described in more detail in British Telecom Technical Journal (BTTJ) Vol. 16, No. 3, July 1998, "YPA—An Intelligent Director Enquiry Assistant" A. De Roeck et al pp 145–155;

System 201 comprises a web assistant for browsing the World Wide Web. The web assistant develops an interest model of the users interests and preferences, using intelligent reasoning techniques. This is described in more detail in British Telecom Technical Journal (BTTJ) Vol. 16, No. 3, July 1998, "The Personalisation of Agent Services" S. Soltysiak et al pp 110–117;

System 205 comprises an email assistant for determining whether incoming email warrants immediate attention or can be reviewed at a later date;

System 207 comprises a telephone assistant, which determines whether a call should be answered immediately, or whether the call may be postponed to a later time or date.

Each agent has its own interface and interacts with the user in its own particular way, and the agents communicate with one another by message passing. These agents are essentially reactive agents that respond to events in the user's environment (such as emails and telephone calls) by initiating interactions with the user, and all of the agents make use of intelligent reasoning computing techniques in order to provide enhanced assistance to the user.

Co-ordinator

Co-ordination of information in the form of inter-agent collaboration has been presented as a feature of many known systems such as the ZEUS system discussed above, and the present system 219 similarly performs such interactions (albeit that the implementation of collaboration is different). However, system 219 additionally provides co-ordination of the presentation of information to the user, which involves considering the constraints of an additional entity, the user (although the entity may be another agent, or process). In general, after an agent has completed its task, its next course of action will be to present the corresponding task results to the user. However, in the absence of some means of controlling when these results are presented, the user may be overloaded with information from many agents simultaneously. Thus co-ordination of agent information is necessary to avoid increasing the cognitive load on the user. This co-ordination typically includes managing the interaction between the agents and the user; performing tasks on behalf of the user that requires the action of more than one agent; and scheduling actions to be performed at appropriate times. This therefore involves receiving task information from other agents, processing the task information into executable system actions, such as the action of allowing an agent to display information to the user, and maintaining a temporal database of these system actions. Although the system disclosed in patent application WO99/05597 (described above) is able to schedule and re-schedule tasks, the issue of scheduling presentation of task information to the user so as to avoid a communication overload at any one time is not addressed.

The apparatus 305 may be a co-ordinating agent having a three-tier architecture (reactive—deliberative—meta-reasoning) capable of planning, scheduling and subsequently executing its own future actions, and it is distinguished from the other reactive agents 201, 203, 205, 207, 209 described above by virtue of this scheduling capability. Thus the co-ordinating agent, hereinafter referred to as a 'co-ordinator', is generally descriptive of the apparatus 305 as a first embodiment of the co-ordinator.

The co-ordinator 305 functions under the control of means 403, which may be provided by Java threads, although it is understood that that: the use of Java is inessential to the co-ordinator and that any other method of concurrently running multiple processes would provide the means 403. Java is a good choice of language for developing multi-agent applications because of its object-oriented and multi-threaded characteristics, enabling each agent to comprise many objects and several threads. It also has the advantage of being portable across operating systems, as well as providing a rich set of class libraries that include excellent network communication facilities.

Figure 3:
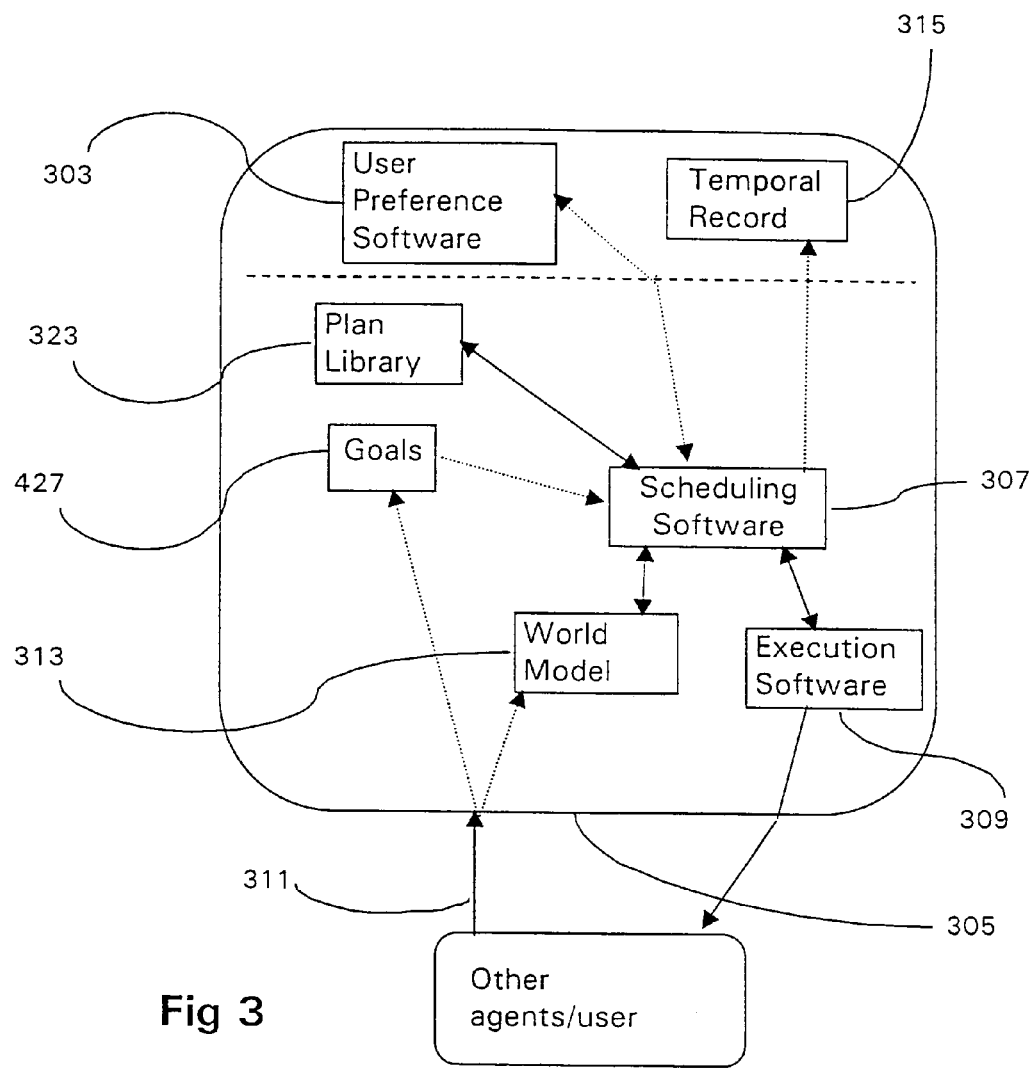
FIG. 3 is a schematic diagram showing apparatus according to a first embodiment for co-ordinating tasks of FIG. 2.

Thus referring to FIG. 3, the first embodiment provides a co-ordinator 305 for co-ordinating tasks to be executed by the computer system 100, including scheduling means 307 to schedule and/or reschedule tasks and execution means 309 to effect execution of the same. The co-ordinator 305 is operable to receive task information 311 and to maintain a temporal record 315 of the schedule of the tasks, such that when a change is made to a task or a new task is sent to the co-ordinator 305, it 305 informs the scheduling means 307 and updates the temporal record 315 accordingly. The co-ordinator 305 also includes a library 323 of task plans, each of which task plans includes a pre-specified action list actionable to perform a corresponding task. The user can explicitly specify an interruption status for allowing or otherwise interruptions to the user, and this may be input to the co-ordinator as task information 311. Typically, the interruption status includes information as to whether the user will accept or refuse interruptions (from, for example telephone calls and email notifications) and the co-ordinator 305 includes a simple interface allowing the user to set these preferences.

The co-ordinator 305 also includes a world model 313, which world model 313 comprises a diary of user tasks and the interruption status, and is accessed by the co-ordinator 305 when scheduling tasks and updating the temporal record 315.

When the co-ordinator 305 forms part of the intelligent assistant system 219, which 219 includes a diary assistant 211 as one of the intelligent agents, the world model 313 replicates the information stored by the diary assistant 211. The world model 313 may store the diary of user tasks as a list of tasks, and each task has a timeslot associated therewith. Each timeslot is defined by a start time and a duration, and when the task information 311 includes, for example, a request to supply information to the user, the scheduling means 307 schedules execution of the request to occur in a free timeslot of the world model 313. If the request involves a task to be performed by the co-ordinator 305 and/or other agents, the timeslot duration may be implicit in the task when scheduled, and this may be used to update the temporal record 315, together with the time that the task was initiated. In practice, if the request is to display information to the user and if the current timeslot is not free, the co-ordinator 305 will either not attempt to schedule the task, and refuse the request, or will schedule the task for a free timeslot in the future, having regard to the world model 313, and the corresponding executable task will be output from the co-ordinator 305 at that time. In the first situation the source of the request will have to re-initiate the request at a later time. In the second situation and the first situation when the current timeslot is free, the corresponding executable task may simply be communication between the co-ordinator 305 and the source of the request to permit the source to communicate with the user.

Figure 4:
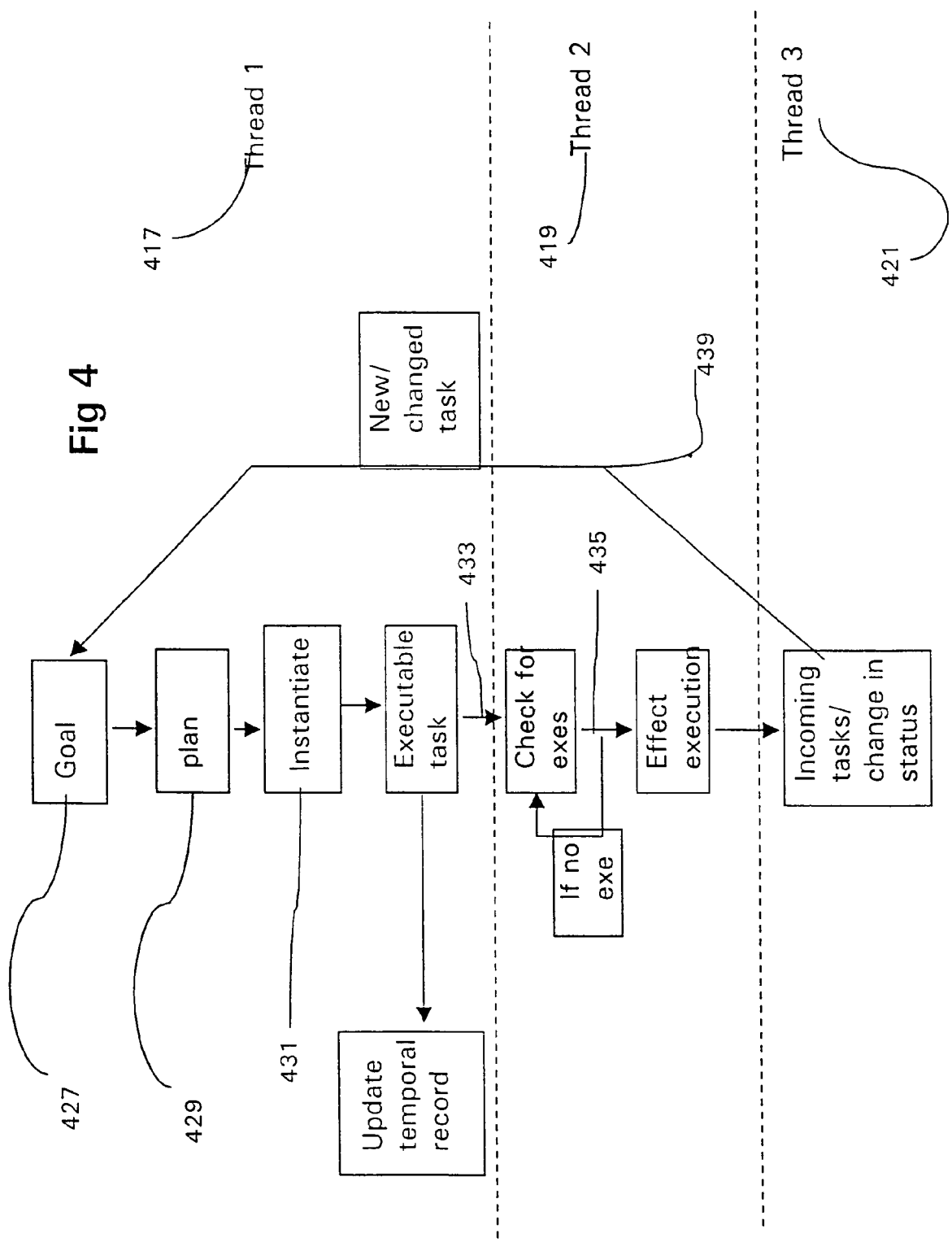
FIG. 4 is a schematic diagram showing the Java thread processes comprising part of the apparatus of FIG. 3.

Java threads 417, 419, 421, shown in FIG. 4, are operable to concurrently execute a plurality of processes, each of which is responsible for executing various processes comprising the co-ordinator 305. When the co-ordinator 305 receives task information 311, a first Java thread 417 translates this into a system goal 427, and retrieves a corresponding plan 429 from the plan library 323. This plan 429 consists of a set of action templates for achieving a particular goal, and the thread 417 is required to instantiate 431 the action template in order to form an executable task using parameters supplied with the goal 427. The task information 311 may include parameters such as a deadline time, which is transferred to the system goal 427, and is then used in conjunction with the action template to specify execution times and a corresponding executable task 433 by the scheduling means 307.

Two types of deadlines may be specified: "as soon as possible", and "as late as possible before the deadline". The goal 427 may have been filtered by a filter (not shown), which is specified by a set of meta-rules and whose job is to select only those tasks that are desirable and are believed to be achievable by the co-ordinator 305. The scheduling means 307 schedules tasks based on the preferred type of scheduling ("as soon as possible", or "as late as possible before the deadline"), taking into account, by consulting the world model 313, other tasks to be executed. Once an action has been scheduled, the temporal record 315, which is a list of active tasks to be performed by the whole system 219, is updated.

Once a task has been processed into an executable task 433 as described above, a second thread 419 picks up the task. The second Java thread 419 repeatedly checks 435 to see whether a task needs executing, and if there is a task to be executed, the execution means 309 passes the information required to execute the task from the co-ordinator 305, as shown in FIGS. 3 and 4. The second thread 419 may run every 15 seconds to check whether tasks need executing, and is capable of retrieving one task in each cycle. If a series of tasks have been retrieved in successive cycles, the tasks are executed sequentially depending on the order in which they were retrieved.

A third Java thread 421 processes the updating of new task information 311, which includes maintaining the world record 313 of the user's activities. This is achieved in part by checking every second for new task information 311, which includes checking for the interruption status information, and by interfacing with the first and second threads 417, 419. New task information 311 may effect deletion of any goals no longer required (corresponding to new information task 311) and scheduling of a replacement (if applicable), or of a new goal. This is shown in FIG. 4 as a feedback path 439, containing task information 311, to the first thread 417.

The co-ordinator 305 may also include means for storing user preference 303, which user preference, in the case of the co-ordinator 305, may include preferred times for performing various tasks, thus enabling the co-ordinator 305 to schedule actions in response to various system goals (such as issuing reminders to read low priority emails). In terms of the standard three-tier agent architecture described above, the task information 311 forms part of the reactive layer; the world model 313, scheduling means 307, goals 427, plan library 323 and execution means 309 form part of the deliberative layer; and the stored user preference 303 and temporal record 315 form part of the meta-reasoning layer.

As described above, the co-ordinator 305 is also operable to manage interactions between the user and the intelligent assistant system 219. Thus, when the system 219 includes a plurality of intelligent agents 201, 203, 205, 207, 209, 211, the co-ordinator 305 interacts with the intelligent agents so as to schedule presentation of their information to the user, taking into account the interruption status, such as "will not accept any interruptions". This is shown schematically in FIG. 2, and the intelligent agents may include at least some of a diary assistant, an email assistant, a Web assistant and a yellow pages assistant. When the system 219 includes the diary assistant 211, this is used to re-set the interruption status every 30 minutes, so that if the user has forgotten to re-set the status to "active" (i.e. "will accept interruptions"), the system 219 takes control and allows interruptions from events such as meeting reminders etc. Clearly the user can override this automatic switch if desired.

As can be appreciated from the foregoing description, the co-ordinator 305 is not a centralised controller for the system 219. Although the co-ordinator 305 can request the agents 201, 203, 205, 207, 209, 211 to effect execution 309 of the tasks passed from the co-ordinator 305, the agents may not perform these tasks. The agents communicate with each other using the Zeus Open Messaging Architecture (detailed in footnote 1), and they 201, 203, 205, 207, 209, 211 operate mostly under the operation of the user, although as described above, notification of information to the user is routed through the co-ordinator 305 as shown in FIG. 2 by the squares 241. In FIG. 2, the ellipses 243 represent requests from the co-ordinator 305 to the agents, and may correspond to the information for effecting task execution 309. The diamonds 245 represent a record of the user's preferences or interests, having been extracted from a database 247 containing user profile data. Thus the agents 201, 203 linked to the diamonds 245 may be web and yellow pages assistants.

Figure 5:
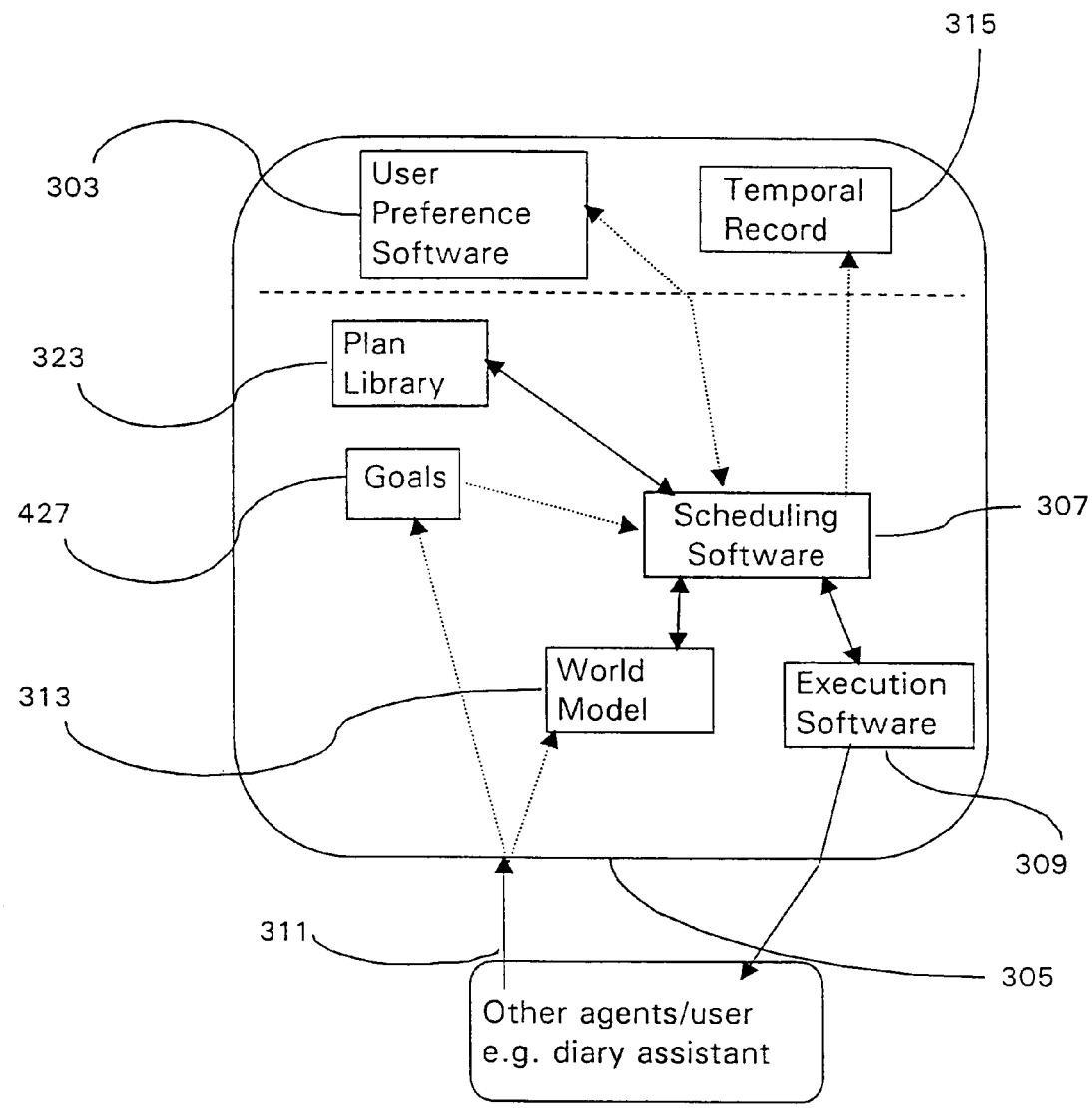
FIG. 5 is a schematic diagram showing apparatus according to a second embodiment for co-ordinating tasks of FIG. 2.

FIG. 5 of the accompanying drawings shows apparatus for co-ordinating tasks to be executed by a computer system according to a second embodiment of the co-ordinator generally similar to that of FIGS. 3 and 4 in which like parts have been given like reference numerals and will not be described further in detail. The second embodiment includes a co-ordinator 305 for co-ordinating tasks to be executed by the computer system 100, but the world model 313 functionality is provided by the diary assistant 211, which stores the user tasks as a list of tasks. As described with reference to the first embodiment, the task information 311 may include, for example, a request to supply information to the user, in which case the execution means 309 will send an execution task to the diary assistant 211, and the diary assistant will schedule execution of the request to occur in a free time of the user's diary. The manner in which such tasks may be scheduled by the diary assistant 211 is described in detail later in the description.

The following presents two scenarios to illustrate the two embodiments of the co-ordinator in operation. The first is a lunch booking entered into the diary by the user, together with a non-interruptible one-hour meeting starting at noon, and the second is a booking entered into the diary to arrange a holiday at a particular, pre-arranged time in the future.

Lunch Booking:

The diary agent 211, forming one of the intelligent agents, sends a message to the co-ordinator 305, represented as a new information task 311 in FIG. 3, describing the lunch booking and meeting. The information task 311 includes parameters relevant to the same, which for this case include a deadline of 5 minutes before the end of the meeting, and details of the person with whom he would be lunching. This 311 is translated into a goal 427, and the appropriate plan 429 is retrieved from the plan library 323. A typical plan 429 for such a scenario may include a yellow pages search for a restaurant; finding the web page of the person having lunch with the user; and reminding the user of the lunch appointment. The scheduling means 307 then specifies a corresponding executable task 433, which may be passed to the execution means 309, and includes an action on the co-ordinator 305 to cause the appropriate agents to process their respective actions (in this case via ellipses 243 to web and yellow pages assistants 201, 203). The following code fragments describe these processes:

```
{
    //basic goal reduction planner
    Goal = GoalList.getGoal ( );
    If (Goal != NULL)
    {
        Plan = PlanLibrary.fetchPlan(Goal);
        If (Plan != NULL)
            Scheduler.schedule (Goal, Plan);
            Goal.setStatus (REDUCED);
    }
}
{
    //assumes that now is the current time
    Task = TaskList.getTask (now);
    While (Task != NULL)
    {
        executeTask (Task);
        Task.setStatus (COMPLETED);
        Task = TaskList.getTask (now);
    }
}
```

When the agents 201, 203 have finished searching, they have to notify the user of the results. This is routed via the co-ordinator 305, shown by squares 41 on FIG. 3, in order to determine whether the user is able to accept interrupts. The co-ordinator 305 accesses the world model 313, which includes details of all of the user's current and future tasks and the interruption status, in order to anticipate a next available timeslot to interrupt the user with the information. Once a timeslot has been ascertained, the co-ordinator 305 may pass an information task 311, including the ascertained time as a parameter, to the scheduling means 307 and this is scheduled in with other user's tasks in the manner described above (goal 427—plan 429—instantiate 431 and schedule 433—send to execute 309 by another agent if required).

Holiday Booking

The user makes an entry using the diary assistant 211, forming one of the intelligent agents. The user thus makes a diary entry to arrange a holiday at a particular, pre-arranged time in the future. Prior to this diary entry, the co-ordinator 305 will ensure that appropriate data is collated and entered into the diary so that the user can successfully request a diary instruction. Thus the user is prompted to enter into the diary an instruction "holiday" which prompts the user for a desired holiday destination.

The diary assistant 211 sends a message to the co-ordinator 305, represented as a new information task 311 in FIG. 3, describing the holiday. This 311 is translated into a goal 427, and the appropriate plan 429 is retrieved from the plan library 323. A typical plan 429 for such a scenario may include a yellow pages search for a travel agent and finding the web page of the corresponding agents. The scheduling means 307 then specifies a corresponding executable task 433, which may be passed to the execution means 309, and includes an action on the co-ordinator 305 to cause the appropriate agents to process their respective actions.

In this case, the schedule involves the use of the classified directory assistant 203 and the web assistant 201. The execution means 309 thus instructs the assistants 203, 201 to carry out tasks to obtain data relevant to the holiday. The directory assistant 203 is instructed to obtain data from travel agents listed in classified directories that offer deals relating to the desired holiday destination. The web assistant 201 is similarly instructed to surf the web to find corresponding information on the internet. Thus, the names and telephone numbers, and possibly other information, of travel agents that offer an appropriate service are obtained.

When the agents 201, 203 have finished searching, they have to notify the user of the results. The data obtained by the directory and web assistants 203, 201 is sent to the co-ordinator 305 as new task information 311. This is translated into a goal 427, having a plan 429 associated therewith, which in this case includes sending a message to the diary to display the results. The execution means 309 thus sends the data to the diary entry slot in the diary operated by diary assistant 211 for scheduling therein. Thus, at the time dictated by an appropriate diary entry, the user is presented with suitable data to enable telephone calls to be made to travel agents in order to arrange the holiday.

Thus, the co-ordinator 305 lifts the burden of many of the steps of arranging a holiday from the user by making reference to a previously defined plan and carrying out a schedule of tasks in accordance with the plan. It will be understood that a number of different plans can be held in the plan library 323 to execute different tasks which may involve other of the assistants shown in FIG. 2.

The co-ordinator thus extends existing agent systems to include temporally specific goals and intentions, and specifically includes apparatus for scheduling and co-ordinating the presentation of information from system agents to the user. The apparatus may include a system that both maintains a temporal world model of the system tasks and schedules interruptions to the user, or it may include a system for maintaining a temporal record of system tasks separate from, but interactive with, a system that schedules interactions with the user. In both embodiments described above, the apparatus is capable of rescheduling actions in responses to changes in the system tasks.

Diary Assistant

Apparatus for allocating time to an event may generally be a software agent known as a diary assistant. The diary assistant 211 uses fuzzy reasoning and scheduling techniques to assist the user in managing a diary so that the user does not have to specifically select a particular diary slot.

Figure 7:
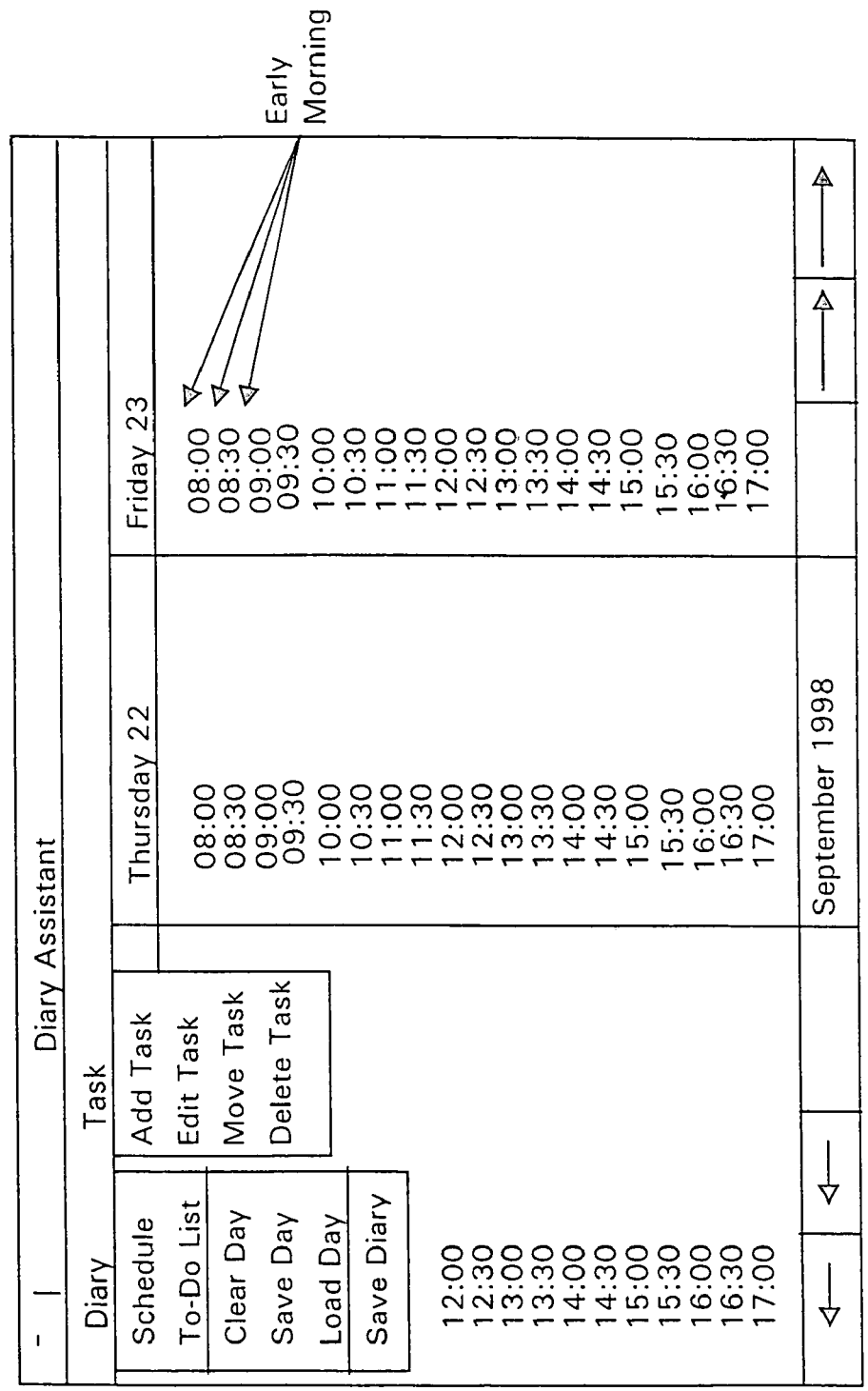
FIG. 7 is a schematic view of the diary display.

There are a number of embodiments of the diary assistant, the first of which enables a single diary entry to be scheduled over a single day, and may be referred to as a local mode of diary entry. When the user invokes the diary, a diary screen is displayed on the display 103, as shown in FIG. 7. This may be achieved either by typing an appropriate command at the command prompt or by activating the diary icon displayed on the screen 103, which icon forms part of the assistant software suite.

Figure 6:
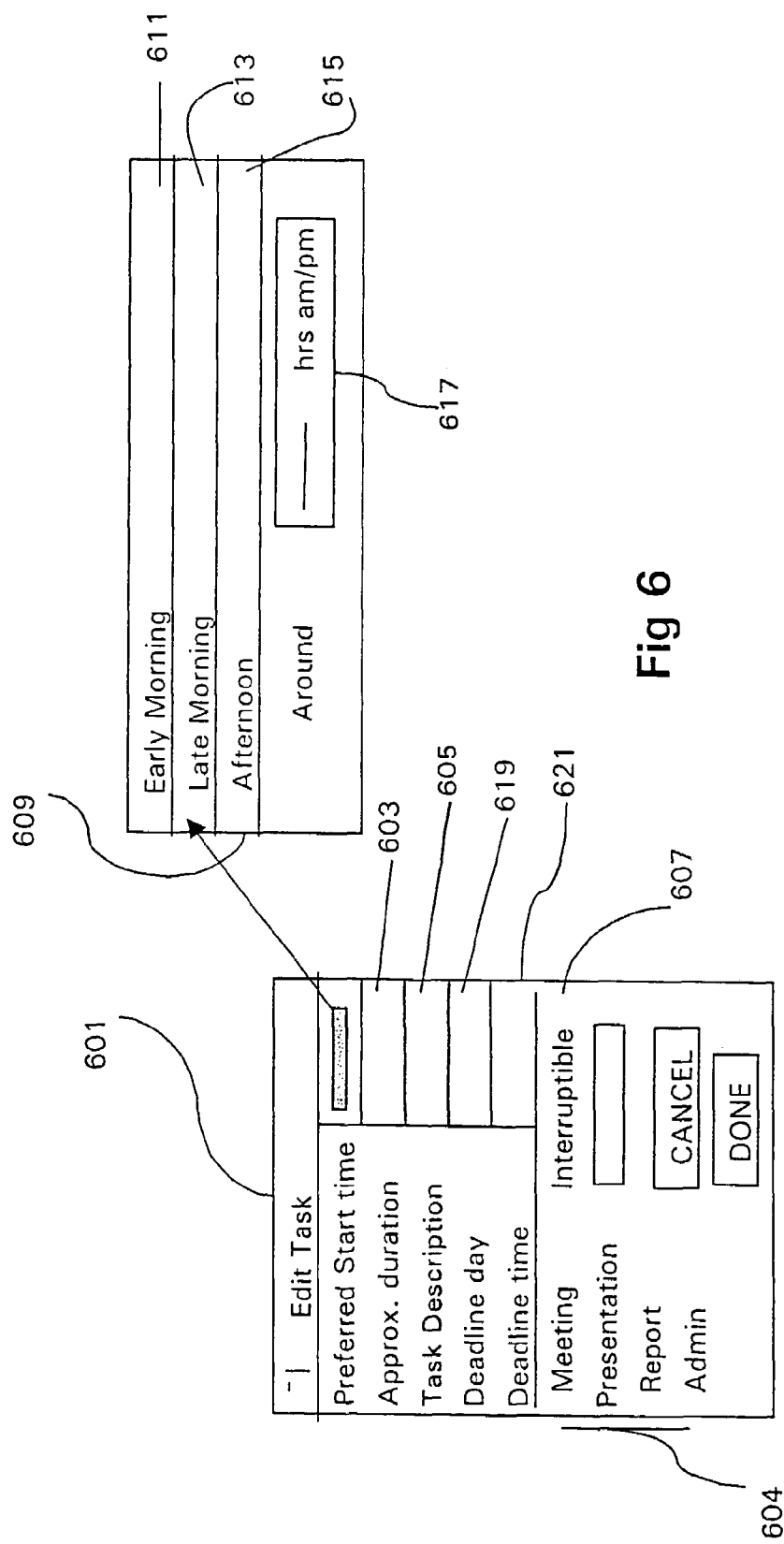
FIG. 6 is a schematic view of the display provided by diary assistant shown in FIG. 2, for making a diary entry.

Referring to FIG. 7, the diary screen displays each day as contiguous diary slots of a half-hour duration. As shown in FIG. 6, the user is prompted to specify details of the diary entry i.e. narrative, in window 605 when the user selects an appropriate menu option from the diary screen. This may be entered via the multi-modal interface 209 e.g. by using the keyboard or selected from the list provided at 604. The preferred duration of the event to be scheduled is entered at window 603, which duration may be entered as a fuzzy entry. For example, when the event is a meeting, and if the user types "around 1 hour" into entry box 603, the diary assistant can apply a corresponding fuzzy function when scheduling the meeting into the diary. Examples of typical fuzzy functions that may be applied for an input of "around 1 hour" may include:

a triangular function that peaks with a value of 1 for durations of 1 hour, and tails either side to a value of 0.3 for durations of 30 minutes and 1 hour 30 minutes (where "around 1 hour" means "Meeting to take anything between 30 minutes and 1 hour 30 minutes");

a trapezoidal function that has a value of 0 for all durations less than 1 hour; a value of 1 for durations between 1 hour and 1 hour 15 minutes; then tails off to a value of 0.3 at 1 hour 30 minutes (where "around 1 hour" means "Meeting to take at least one hour, preferably not longer").

The user may set a desired fuzzy function, depending on the type of meeting.

The user is also prompted to indicate in window 607 whether the event described in window 605 is interruptible or not i.e. whether the user does not want to be disturbed during the duration of the diary entry, e.g. during an important meeting. These parameters defining the diary entry may be described as constraints of the entry.

A Mouse cursor (not shown) can be used to enter a preferred start time for the diary entry in window 601.

When the cursor is moved onto window 601, a further window 609 is displayed, allowing the user either to choose one of a number of fuzzy definitions for the start time of the meeting or to type the start time, or fuzzy definition explicitly. In this example, the user can operate the mouse to choose early morning 611, late morning 613, afternoon 615. When the user enters a time in window 617, the diary assistant can seek a diary slot generally around the entered time.

In the following description, it will be assumed that the "early morning" time 611 has been selected and that the local mode is operative for Wednesday as shown in FIG. 7. The early morning window 611 has an associated fuzzy function shown in FIG. 8. For the early morning selection, the diary assistant assumes that time slots from 8.00 am to 9.30 are within range and each of them is given a fuzzy ranking between 0 and 1. The time slot of 8.30 am is preferred and is given fuzzy ranking=1. The time slot of 8.00 am is next preferred and given a ranking of 0.75. This is followed in preference by the 9.00 am time slot which is given a ranking of 0.5 and the time slot of 9.30 am is least preferred, with a ranking of 0.25.

Figures 8, 9:
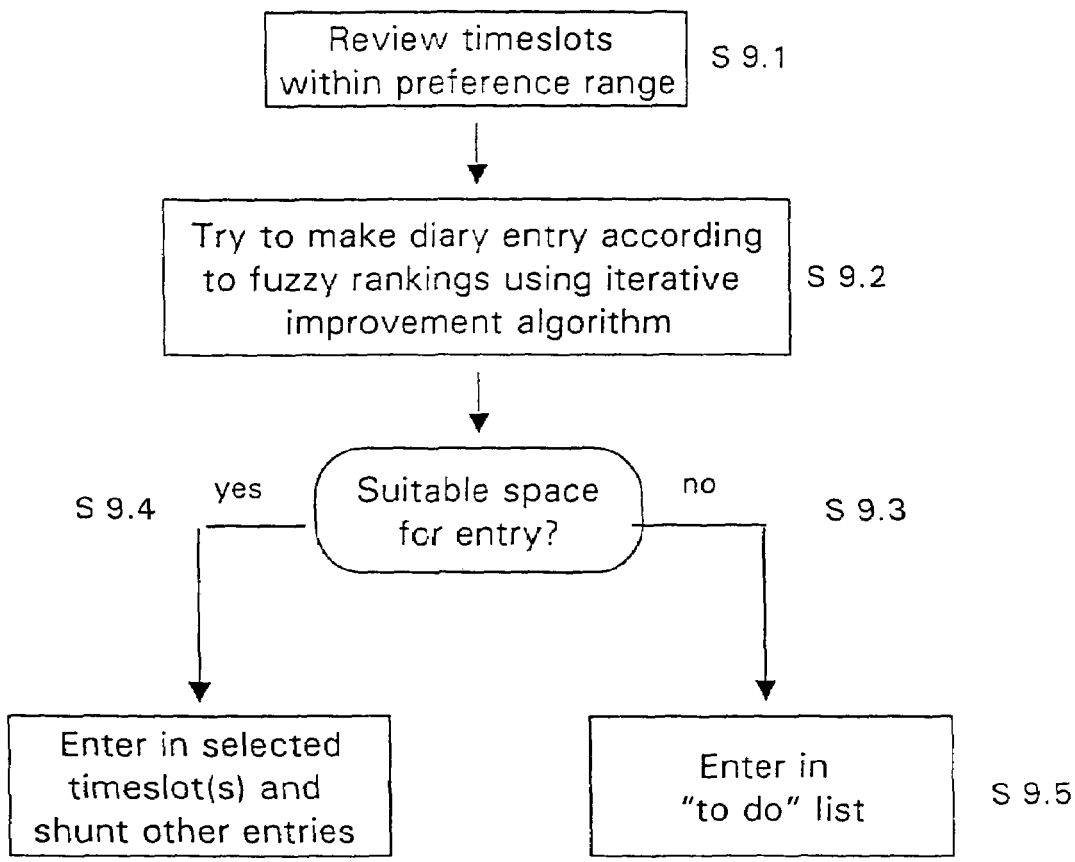
FIG. 8 is a table of fuzzy rankings for the diary preference "early morning" shown in FIG. 6.
FIG. 9 is a flow diagram of the diary entry process according to a first embodiment.

It will be understood that the fuzzy rankings shown in FIG. 8 are only one example of different values that can be used. Generally the values may be defined by a function which has a peak at the most desirable time and tails which decrease on either side, towards zero. For example a triangular function could be used, with a peak at the most preferred time and straight line slopes to zero on either side, with a total time width of two hours. Alternatively a trapezoidal function, or functions having a mixture of a flat portion, a slope and a peak could be used to define the fuzzy rankings.

Certain time slots may already be filled with previous diary entries and so the diary assistant seeks to find the most preferred free entry according to the fuzzy rankings. This will now be described with reference to FIG. 9.

S9.1 The assistant 211 reviews the time slots within the preference range set by the table shown in FIG. 8. It will be understood that some of the time slots may have already been taken by previous diary entries;

S9.2 The assistant 211 decodes the selection into dates or periods within the system diary and attempts to make the diary entry according to the fuzzy rankings of FIG. 8. This is achieved by initially inserting the new task into a space according to the order of preference shown in FIG. 8, which may include moving tasks already scheduled into the diary. If suitable time slots are available, this merely involves selecting the available time slots according to the order of preference shown in FIG. 8. However, if sufficient time slots are not available, the assistant 211 makes use of an iterative improvement algorithm in order to review the previously entered diary items and their fuzzy rankings in order to determine whether they can be shunted, without changing their order so as to open a sufficient span of time slots to allow the new diary entry to be inserted. A suitable iterative improvement algorithm is described in "Artificial Intelligence—A Modern Approach" by S. Russell and P. Norvig, Prentice Hall, USA pp 111–113. The fact that both the duration and start times of the events are described by fuzzy functions provides considerable flexibility in scheduling diary entries.

S9.3 The result of running the algorithm is reviewed. If successful, the new diary entry is entered into appropriate time slots' at step S9.4 and the previous diary entries are, if necessary, shunted, without changing their order to accommodate the new diary entry. Alternatively, if the outcome of running the algorithm at step S9.2 is unsuccessful, the diary entry is not made and is instead entered on a "To Do" list at step S9.5 of FIG. 9.

The following code fragments describe the specific implementation of the iterative improvement method described at step S9.2:

```
Schedule(Allocation A)
{
        N = neighbouring solution states of A;
// N is a Set of allocations neighbouring A (reachable by a single
transformation step)//
        if (N = { })
// N={ } indicates that there are no neighbouring states that satisfy the
scheduling constraints//
        return A
    else
                A' = best state in N;
//A' is the element of N with the highest score//
                if (score(A') <= score(A))
// score (X) returns a number between 0 and 1 according to a predetermined
fuzzy function//
                        return A
                else
                        return Schedule(A')
}
```

It will be understood that the late morning and afternoon windows 613, 615 have associated fuzzy ranking tables that correspond to the table of FIG. 8, but for the late morning and afternoon respectively.

As regards the "around" window 617, a fuzzy ranking table is provided which defines fuzzy rankings in a time window around the entered time. Thus, the time slot which includes the entered time has the highest fuzzy ranking and time slots further away from this have progressively lower fuzzy rankings.

The previously described embodiment constitutes a local mode of operation of the diary assistant, in which a single diary entry is made on a particular day. A second embodiment of the diary assistant enables multiple diary entries to be scheduled over several days, and may be referred to as a global mode of diary entry. The global mode may be used to schedule a set of partially scheduled and unscheduled tasks, which may, for example, be tasks on the 'To Do' list discussed above, or tasks which have been placed on the diary, some of which may have been entered at 'fixed' times. In the case of selecting tasks to be scheduled from the 'To-Do' list, the user may indicate the tasks that are required to be scheduled, while tasks that are 'fixed' at a particular time may be so indicated by double clicking on the diary entry in the diary. These 'fixed' diary entries will not be shunted around when the diary assistant performs its scheduling.

Figure 10:
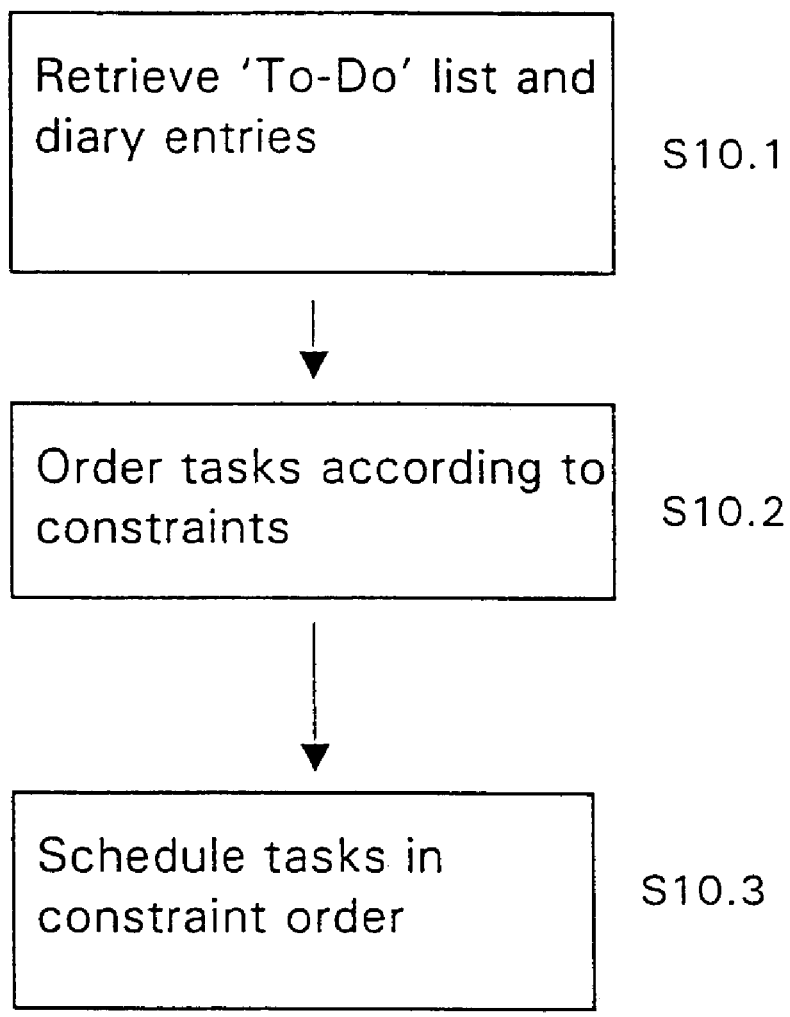
FIG. 10 is a flow diagram of the diary entry process according to a second embodiment.

In this mode of operation, scheduling of multiple tasks may be performed over a plurality of days. When these tasks are entered into the diary, the user can operate the mouse to enter early or late in the week in the window 601 as described above, or alternatively a date range may be selected (not shown). This then provides the fuzzy parameters to be used in the global mode. Referring to FIG. 10, these may be used to find an appropriate slot in a day as follows:

S10.1 The system may start with a partial schedule for tasks that have been entered into the diary by the user, and are 'fixed'—this is retrieved, along with the tasks selected from the 'TO-DO' list;

S10.2 The assistant 211 orders all of the tasks to be scheduled according to their constraints. Thus the most constrained tasks, such as those that are limited to a specific start time, appear first, and the least constrained tasks appear last, where a measure of the degree of constraint may be the number of possible slots that could be assigned to a task. Thus, a preference of a Monday morning task is more constrained than a Monday task, which is more constrained than an early week task.

S10.3 Once the tasks are in order, they are scheduled one by one, following the above order. The search applied to schedule the tasks may be a standard "depth-first with backtracking" method, such as is described in "Artificial Intelligence—A Modern Approach", supra pp. 77–78, in which tasks are assigned timeslots in order, and in the event of not reaching a solution, the search backtracks to an earlier point and tries an alternative timeslot.

The following code fragments describe the specific implementation of the depth-first method used in step S10.3:

```
Schedule(TaskSet T, Allocation A)
{
    if T = { }
// T={ } indicates that there are no free timeslots in the allocation that satisfy
the user preference scheduling constraints//
        return A;    %success
    else
        t = first(T); T = rest(T);
        p = user preference for t;
        S = free timeslots in A satisfying p;
        if (S = { })
            return null;   %backtrack
// If S returns with no free timeslots to satisfy the first task t, which (first
task t) is determined by the order generated at step S10.2, the procedure
returns ("backtracks") to try another set of conditions that will satisfy the
preferences of this task//
        else
            repeat
                s = first(S); S = rest(S);
                A' = Schedule(T, A union {<t: s>})
            until (A' != null) or (S = { })
            return A'
// This takes each of the tasks in order, (where the order has been set by step
S10.2 above) and schedules them one at a time. If a time cannot be found that
satisfies the preferences of the task in question, the procedure will return a
pointer to the task and will "backtrack" in order to find a time that will satisfy
the preferences. When all of the tasks have been scheduled the procedure
returns.//
}
```

The global mode is thus directed towards satisfying all preferences accompanying the tasks to be scheduled and the assistant tries to allocate timeslots that best match the preferences.

A third embodiment of the diary assistant is concerned with "roughly scheduling" tasks over a month, week, day or hour (local or global). "Roughly scheduling" means that the diary is not required to allocate a specific time to the entry, but is instead required to assess the availability of suitable time periods for completing whichever task corresponds to the entry. As an example of an entry that may utilise this embodiment, a user may enter "complete an 18 hour task by the end of this week" into the diary on a Monday morning. All the user wishes to know is whether, within the constraints of the fixed diary entries entered using the first and second embodiments described above, there are sufficient time periods (in this example the time period is 18 hours) available for this task to be completed. Preferably the diary will inform the user as the number of available periods reduces, and the diary will maintain a "To-do" list detailing which tasks have the "roughly scheduled" status.

In this embodiment, the diary screen displays time as contiguous diary slots that are commensurate with the scale of time period for which the event is to be roughly scheduled. Thus if a task requires to be completed in a week, the diary may display weeks within a month, while if a task requires to be completed in a day, the diary may display days within a week (not shown).

Figure 11:
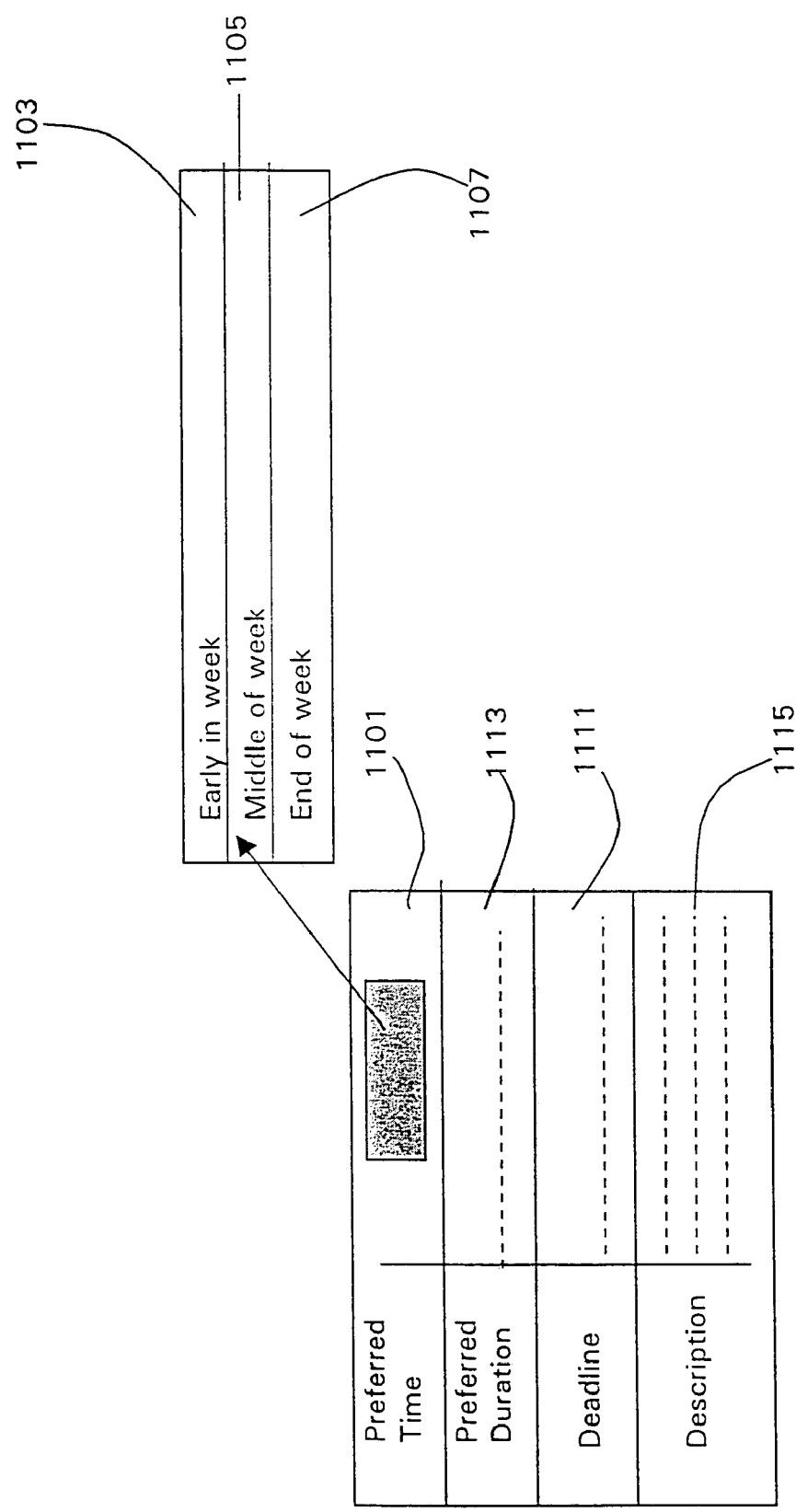
FIG. 11 is a schematic view of the display provided by the diary assistant shown in FIG. 2 according to a third embodiment.

Referring to FIG. 11, the user interface accompanying this diary entry is a modified version of that shown in FIG. 6. The user may select one of several such user interfaces to enter the task, where each corresponds to an approximate duration of the task to be completed (order of hours, days, weeks etc.). FIG. 11 shows a diary entry screen corresponding to a task that is estimated to take several days, and thus the options available in window 1101 allow a user to select from periods of several days in a week.

As described with reference to the first embodiment, the entry screen has a set of fields 1101 to 1115 which the user selects. In a first field 1101, the user may enter a preferred time to perform the task, either selecting from several possible selections such as "early in week" 1103, "middle of week" 1105, "end of week" 1107, or explicitly entering the preferred time into the first field 1101.

In second and third fields 1113, 1111, the user may also enter a preferred duration and deadlines such as "by the end of this week". The preferred duration entered in the second field 1113 may be fuzzy as for the first embodiment. In a fourth field 1115, the user may enter a description of the task, such as meeting, admin, lunch etc.

Figure 12:
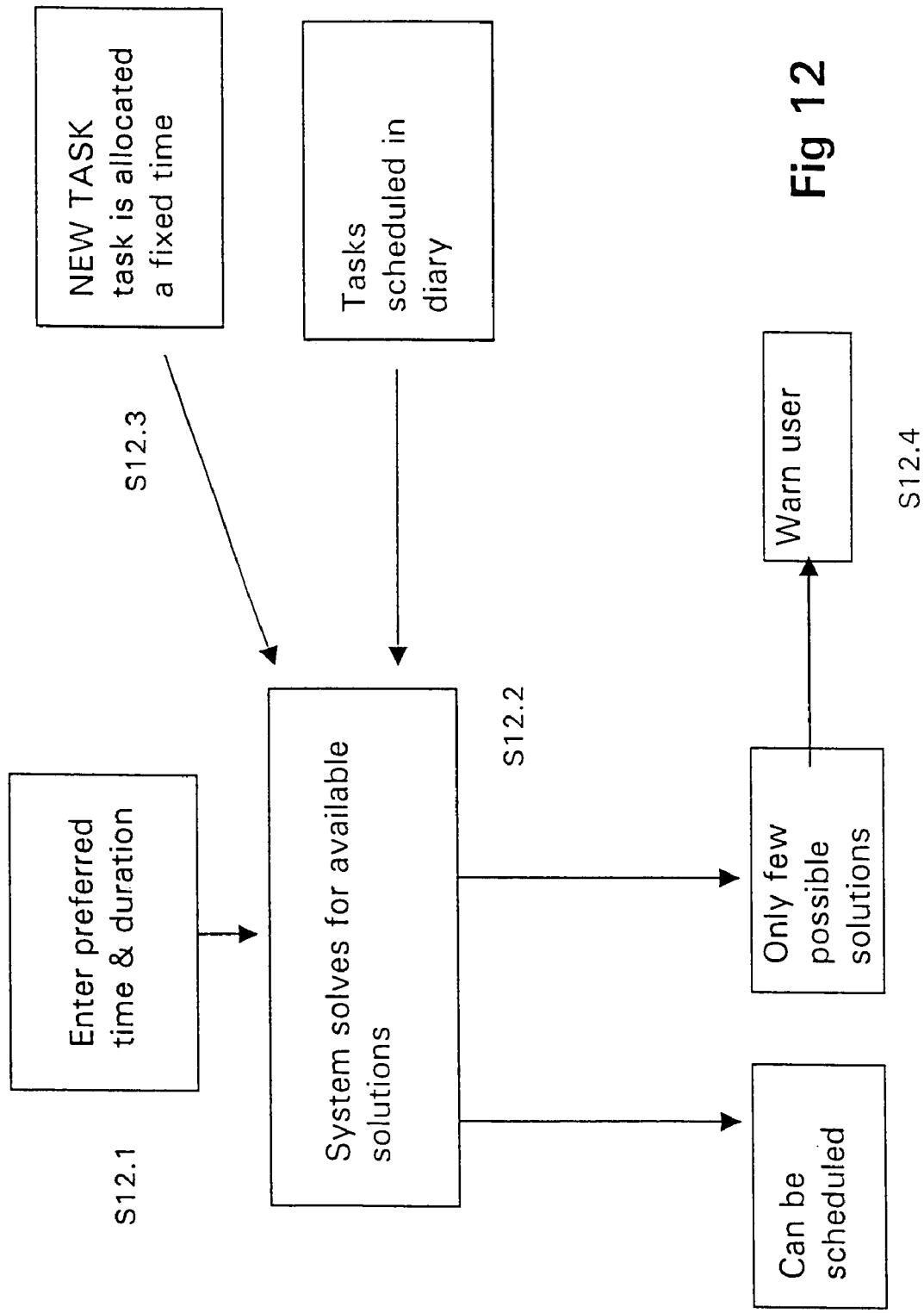
FIG. 12 is a block diagram of the diary entry process according to a third embodiment.

The diary decodes the selection into dates or periods within the system diary and applies a fuzzy logic function, which may be similar to that described with reference to FIG. 8, thereto, the maximum of which coincides with this selection (as described with reference to the first embodiment). Clearly the time periods in this embodiment may vary from 30 minutes (for example "I must send an email to A by Friday, duration of writing email is approximately 30 mins"), to the 18 hour task described above, or longer still, as dictated by the duration box 1113. The user may also enter a description of the task into a fourth field 1115. Thus in operation, and with reference to FIG. 12, the "rough scheduling" procedure comprises the following steps:

S12.1 User enters fuzzy definitions in the first and second fields 1101 and 1113, together with a deadline time into third field 1111 and a task description into the fourth field 1115;

S12.2 Diary assistant 211 assesses the availability of potential time periods that would satisfy the task requirement. This may include starting at the deadline time displayed in the diary entry screen, and working backwards therefrom, scheduling all of the tasks that are both on the "To-Do" list and are fixed in time, as described above with reference to the first and second embodiments. This may then be followed by an assessment of capacity, realised, for example, by summing the durations of these allocated diary entries in the potential time periods, subtracting the summation from the potential time periods to give a free period, and comparing the free period with the duration of the diary entry. Clearly, for a task of, say, multiple hours, this method may result in the task being split over non-continuous time slots in the diary (for example: 2 hours free on Friday, but the 2 hours are 2×1 hour slots either side of a meeting which is fixed);

S12.3 As new entries are entered according to the first and second embodiments, the assessment at S12.2 may be repeated in order to continually assess the number of potential time periods available to the user;

S12.4 If the number of available rough time periods falls below a pre-determined number, the user may be informed by the diary, by a series of warnings.

Thus, for the above example of roughly scheduling an 18 hour task, which had been entered into the diary as "later in the week", deadline of "by the end of this week", duration 18 hours, there may be several times available which meet these requirements. However, by Wednesday of that week, with a potential influx of new scheduled tasks according to the first and second embodiments, there may be very few times available.

The diary assistant 211 may be operable to automatically reduce the time allocated to one of these roughly scheduled tasks at various stages of completion thereof. The user may highlight the task in question on the rough "To-do" list described above in order to indicate that he has started working on that task. This may cause the diary to start a system clock against this time. Once the user has finished working on the task, and he communicates this to the diary via the "To-do" list, the clock stops. Depending on how much time that the user has spent on that task, the diary assistant may re-compute the availability of potential time periods that would satisfy the task requirement, (where the task requirement has been modified according to the time calculated by the system).

The three embodiments described above demonstrate the flexibility of the diary assistant to accommodate a range of scheduling requirements. In practice human beings often categorise tasks according to whether they are required to be done at a specific time (obvious start time and deadline), or whether they should be done by a certain time, for example to fit within project parameters, or other people's schedules. Thus the combination of the first, second and third embodiments allow these different scheduling constraints over a range of time scales without the specific need to look for a particular vacant diary slot.

The above embodiments assume that the tasks to be scheduled are independent of each other. In practice, however, several tasks may be inter-related—for example a presentation scheduled as a Monday task at 4 pm may include diary entries for preparing for the presentation along with writing a paper to be distributed at the presentation. The tasks would, in the embodiments described above, be entered as separate diary entries, and if, for example, the date and/or time of the presentation changed, the entries corresponding to preparation of the paper and presentation material would require moving manually if the original inter-task time is to be preserved.

A fourth embodiment of the diary assistant allows the user to specify constraints between tasks, which may be referred to as inter-task constraints, at the time of entering the tasks into the diary. This is effected by means of a task plan 1300, shown in FIG. 13 of the accompanying drawings. A task plan 1300 may include task elements, or tasks, that are directly related to one another, such as, with reference to the above example of a presentation, preparing for the presentation and writing a paper 1303, 1305. A task plan may also include task elements that are not directly related, such as attending a meeting and writing a paper, where the user wishes to explicitly relate the tasks together in some way, e.g. temporally (not shown). In the presentation example, such inter-task constraints may include the number of days between preparing for the presentation and writing the paper relative to the presentation date itself. These inter-task constraints may be accompanied by time preferences specific to each task described above for the first, second and third embodiments, such as task duration.

Figure 13:
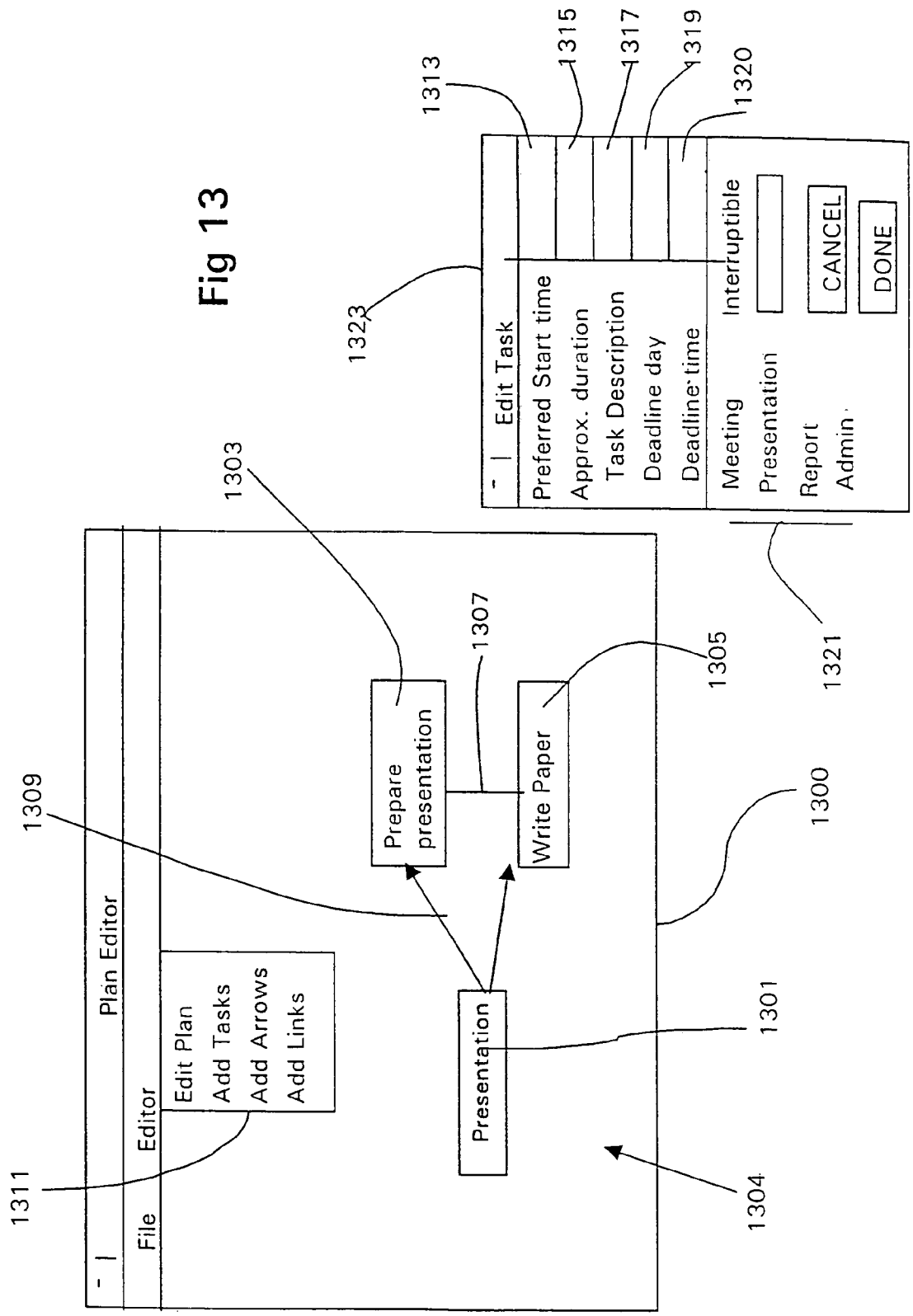
FIG. 13 is a schematic view of the display provided by the diary assistant shown in FIG. 2 according to a fourth embodiment.

The relationships between tasks may be defined using a task plan editor 1304, which may be a visual programming interface such as that shown in FIG. 13. Each task may be represented as a box, for example boxes 1301, 1303, and the relationship between tasks may be defined by links 1307 and/or arrows 1309 therebetween. Arrows 1309 may be used to define a temporal precedence order between the said tasks, while links 1307 may be used to specify constraints between tasks where no direct temporal relationship exists. The links 1307 may store information describing inter-task relationships that are not precedent-related. These may include constraints such as "at the same time of day", and are fuzzy definitions that are resolved into times on the diary according to fuzzy relationships similar to those described above with reference to FIG. 8 when the diary assistant 211 processes the task plan. A link 1307 could therefore be used for tasks that can be done in any order, which in the above example of a presentation may include booking a room and ordering refreshments; although those tasks have to happen before the presentation itself, they can happen in parallel.

In the present embodiment, where tasks are inter-linked, typically one of the tasks acts as an anchor for the other tasks. Referring to the above example tasks of a presentation, preparing a report and preparing the presentation itself, the presentation acts as an anchor for the other tasks. Thus, with reference to FIG. 13, the anchor task T1 1301 is first added to the task plan, and all other tasks are constrained by this task, either directly or indirectly. In the task plan editor 1304, this task T1 may appear red, and all other tasks may appear green, thus distinguishing the main task from other tasks. The precedence is unidirectional, as symbolically indicated by the arrows 1309. This means that if a task T3 forming a task element of a specific task plan (which includes, say, 5 tasks T1, T2, T3, T4, T5, listed in order of dependency constraint) is moved to a different time, only T4 and T5 will be re-scheduled by the diary as a result of the move. In this example, task T1 is the anchor task, and as it is higher up the inter-task hierarchy than T3, it is unaffected by the move. The dependency constraint may be given by the shortest path to the main task as dictated by the arrows, together with the links, and the order in which tasks are constrained follows a directed a-cyclic graph.

Tasks may be added to a plan via menu option 1311, which enables the user to specify a task description, either explicitly in 1317 or by selecting from a pick list 1321, a duration of task 1315, and any additional temporal constraints particular to the task in question via dialogue box 1323. Once added to the plan, the tasks may be edited, moved or deleted either by double clicking on the box in question, dragging the box around the screen, or selecting an appropriate menu opt; ion. The links 1307 and arrows 1309 may be similarly added to and edited in the task plan.

Template task plans may be created for specific task categories, such as meetings, presentations, seminars, where the core task elements characterising the task are standard. Thus a user can create a 'New' 'Meeting' task plan, whereupon the plan editor will invoke the elements defined in the template. The user may then edit and add to these elements to produce a customised plan as required.

Once a plan is completed, it is submitted to the diary assistant 211 for scheduling into the user's diary. Whilst editing, clearly the plan may be saved and closed without submitting it for scheduling. The scheduling procedure comprises the following steps (not shown in a Figure):

S13.1 The assistant 211 orders all of the tasks elements, or tasks, according to their dependencies. Thus the most constrained tasks, such as task T1, appear first, and the least constrained tasks appear last, where a measure of the degree of constraint may be the number of possible periods that could be assigned to a task (determined by the fuzzy precedence on links 1307) together with the inter-task order (determined by the arrows 1309);

S13.2 Once the tasks are in order, they are scheduled one by one, following the above order. The search applied to schedule the tasks may be a standard "depth-first with backtracking" method, described in step S10.3, in which tasks are assigned timeslots or time periods in order, such that in the event of not reaching a solution, the search backtracks to an earlier point and tries an alternative timeslot or time period.

This embodiment is thus similar to the global mode described in the second embodiment, and is directed towards optimally satisfying all precedents accompanying the task elements to be scheduled.

If, after scheduling the task plan, one of the task elements is independently edited within the diary, the diary assistant 211 will attempt to satisfy the inter-task plan criteria as well as any new conditions introduced by the change. If the two conditions are incompatible, the user may be informed and prompted to review either the task plan or the most recent change. If a higher priority status has been attributed to the overall task plan, the diary assistant 211 may ignore the independent change and retain the original schedule, informing the user of its decision. Clearly this feature is common to all embodiments of the diary assistant.

Thus for the first example given, where the date of a presentation 1301 changes, task elements of preparing for the task and writing the paper 1303, 1305 will be rescheduled as a result of the single action of moving task 1301 corresponding to the date of the presentation itself. In other words, the task element precedence specified by the arrows 1309 enables a whole task plan to be re-scheduled by moving the anchor task only.

Each task, or task element, comprising a task plan may be the responsibility of, or "owned by", one user, but the user may vary between task elements. The user who initiated the anchor task 1301 may own the task plan itself. Users having access to edit a task plan may be specified by the owner of the task plan (not shown), and the user responsible for the task element(s) may be specified in a field (not shown) in the dialogue box 1323. When each of the users has a diary assistant to manage their schedules, the diary assistant associated with the user that owns the task plan will send a message to each of the other respective users once the task plan has been completed. For each user, this message may include details of the task element(s) to be performed by the user, together with the temporal preferences specified in the "Add/Edit Task" dialog box 1323. The respective diary assistant will then attempt to schedule the task element(s) in accordance with the methods described in previous embodiments.

Referring to the example of the presentation task, the owner of the task plan may be the user giving the presentation, and this user may also be responsible for drafting the report and drafting the presentation material. However, booking a room and ordering refreshments may be the responsibility of the owner's secretary. Thus once the owner has submitted the task plan to its diary assistant for scheduling, and the owner's diary assistant has ordered the tasks according to the dependencies within the task plan (S13.1 above), the owner's diary assistant will send a message to the secretary's diary assistant. This message will specify the task element(s) to be performed by the secretary together with the temporal conditions resulting from the ordering at S13.1, and the secretary's diary assistant will accordingly schedule a time for these task element(s).

In order to pass information between diary assistants as described above, the assistants communicate with each other using the Zeus Open Messaging Architecture. Details of this architecture may be found in 'ZEUS: An advanced tool-kit for engineering distributed multi-agent systems', Proceedings of the third International conference on Practical applications of intelligent agents and multi-agent technology, 1998, 377–391.

It is understood that implementation features such as menu options, dialogue boxes, arrows, links and task boxes are inessential to the diary assistant, and that any equivalent means could be used to realise the above embodiments of the invention.

A fifth embodiment of the diary assistant applies the fuzzy and scheduling techniques disclosed in the first and second embodiments to enable meetings to be scheduled between a host and participants of the meeting. Both the host and the participants have diary assistants 211 to manage their diaries, shown in FIG. 14, and it is assumed that the host diary assistant 1401 is the initiator of the meeting. Existing products, such as Microsoft Outlook Calendar, allow a host to request a meeting, but the host is required to specify an exact time, and the participant is required to manually check his or her diary before confirming or declining the offered time. The scheduling system described in "An automated meeting scheduling system that utilises user preferences", Haynes et al, Autonomous Agents 97 pp. 308–316 presents a system that includes a set of distributed agents which are designed to schedule meetings. The system is designed to be adaptive to environmental demands and user preferences, where the preferences relate to a range of parameters including accommodation, meeting length, participants of the meeting etc. In this system the preferences are specified in relation to a threshold value, where the thresholds are unique to each user. When a user specifies a value above the threshold, this is a positive return, whereas if the user specifies a value below a threshold, this is a negative return. For example, in the case of selecting a date for a meeting, the user may set the threshold at 0.4, and return 0.25 for a Monday and 0.7 for a Friday, indicating a 'no' for Monday and a 'yes' for Friday. Messages, including suggestions of free time slots, are passed between agents using email, and the participant's scheduling system examines the preferences set by the users in the manner described above in order to return attendance possibilities.

By contrast, the diary assistant makes use of the fuzzy techniques embedded within the diary assistants to handle requests for meeting times so as to allow the host to offer a series of periods within which the meeting should be scheduled. Each series of periods may decrease in time scale, in an attempt to converge towards a mutually convenient time for the meeting. Examples of typical time scales that may be used include early in the week, specific day early in week, period within day, specific hour in period.

Figure 14:
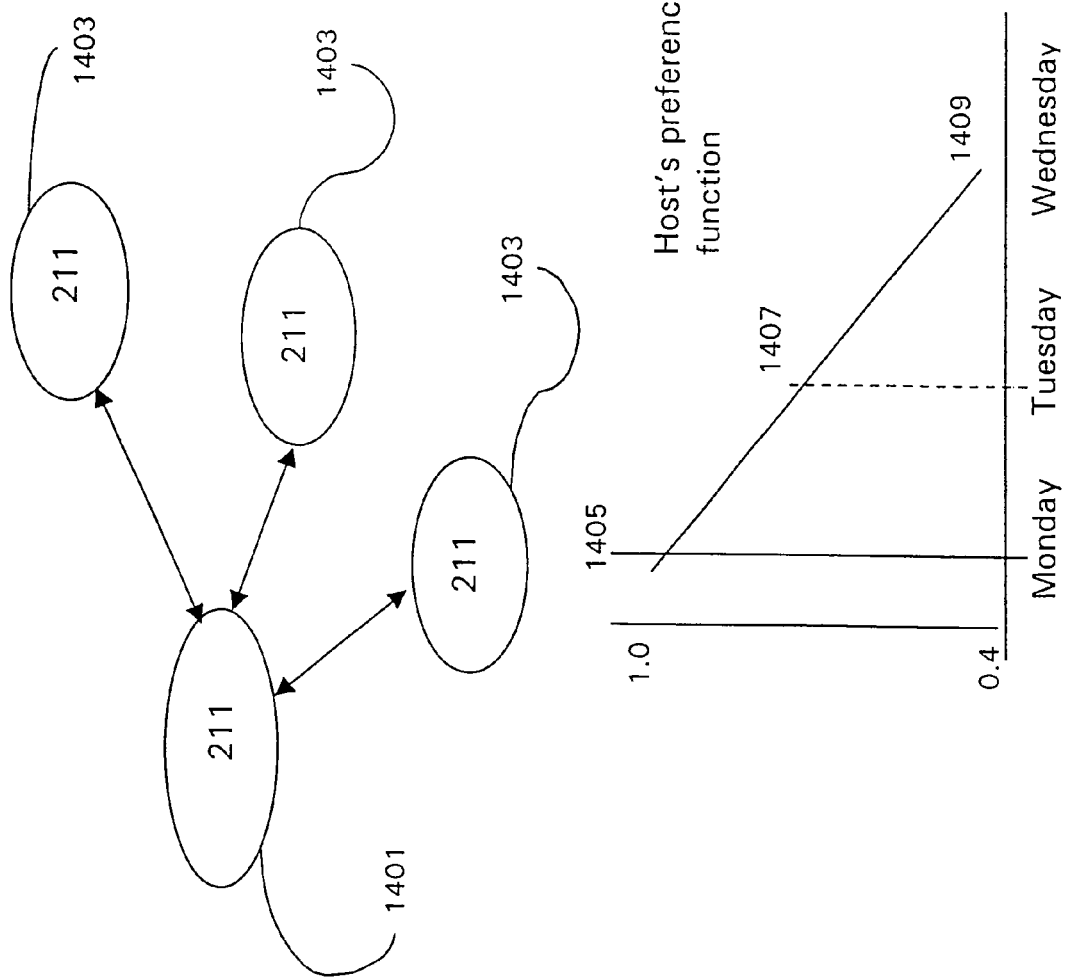
FIG. 14 is a schematic diagram showing an arrangement of diary assistants according to a fifth embodiment, together with a graphical display of a host diary preference function according to the fifth embodiment.

The procedure whereby the assistants interact in an attempt to find a mutually convenient time for the meeting is called 'negotiation', and the replies from the participant's diary assistants are called 'bids'. Thus the bids are assessed by the host diary assistant, which negotiates a time that satisfies the bids. The bids are a function of the free slots in a participant's diary, together with the participant's preference. Referring to FIG. 14, the former may be extracted by the participant's diary assistant 1403 without interaction with the associated user, while the latter involves the same diary assistant 1403 asking the associated user to specify a fuzzy preference profile. The functions used to derive free timeslots may be similar to those described above in relation to the first and second embodiments, thus including an iterative improvement algorithm.

As discussed with reference to passing messages between diary assistants in the fourth embodiment, the diary assistants communicate with each other using the Zeus Open Messaging Architecture.

Figure 15A:
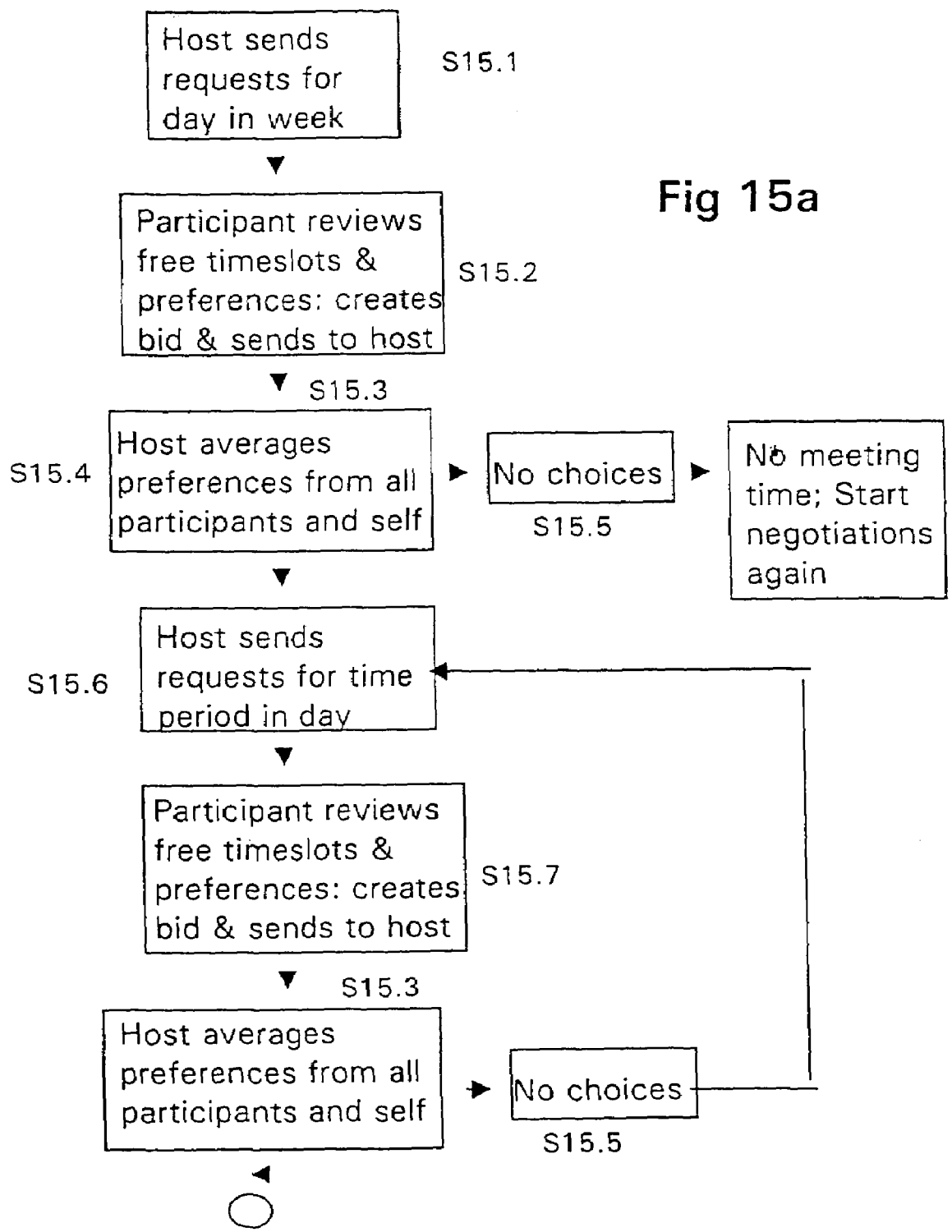
FIGS. 15a and 15b are, in combination, parts of a flow diagram of a negotiation process of the fifth embodiment.
Figure 15B:
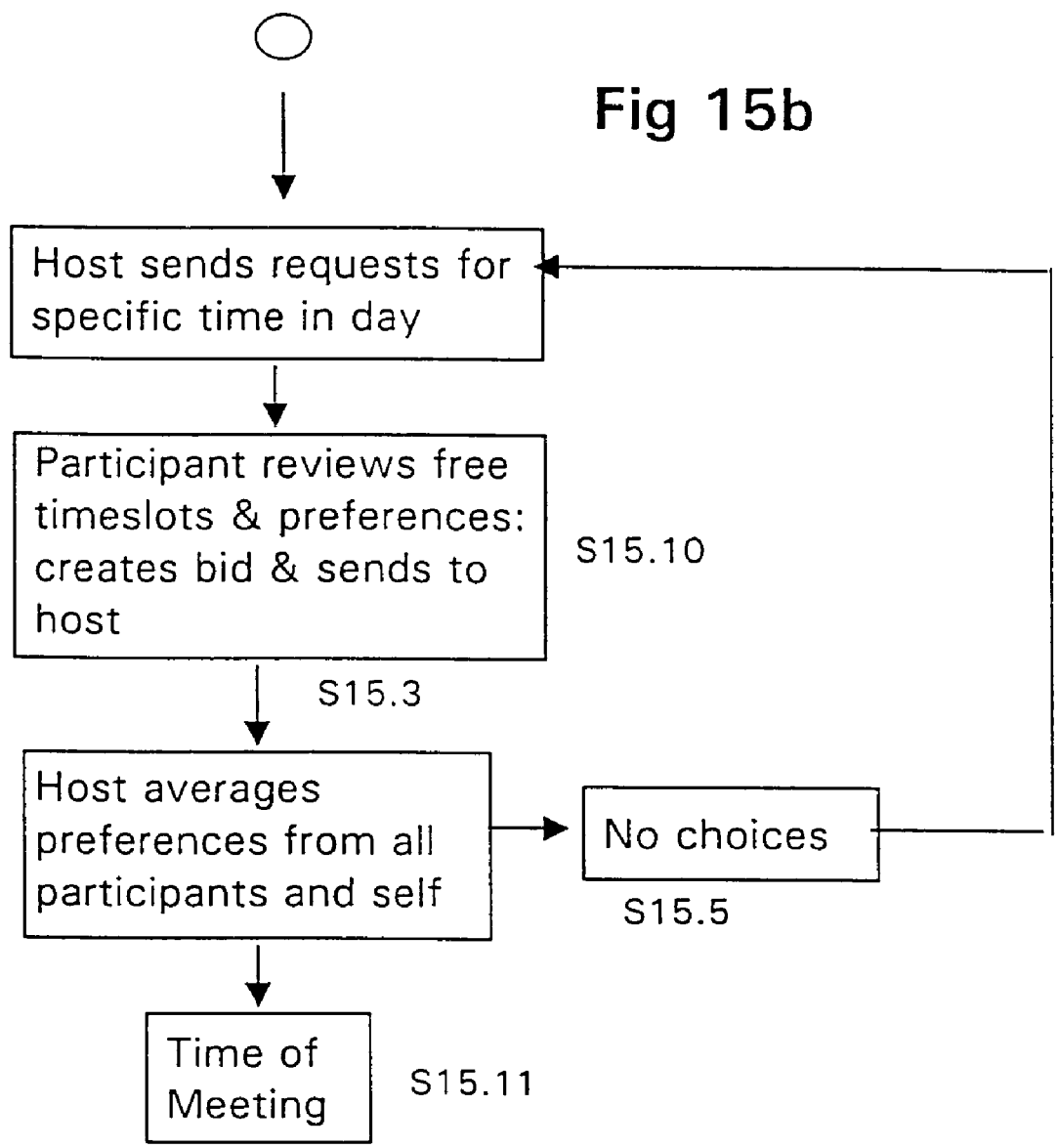

The following steps, with reference to FIGS. 15a and 15b, outline the system in operation:

S15.1 The host diary assistant 1401 may commence a first round of negotiations by sending a request to the participant's diary assistants 1403, which request specifies a period in the week for holding the meeting, such as "early in week";

S15.2 Each of the participant's diary assistants 1403 consults its respective diary in order to extract all of the free time slots in the participant's diary that fall within "early in the week", and requests preferences within the early week time period. The preference may be specified by the participant as a function of days within the period: as a fuzzy function—for example—the participant may prefer Tuesday the most, then Monday, then Wednesday. This may then be translated into a fuzzy function over the early week period, where the function has a maximum at Tuesday;

S15.3 Preferences for each day within the early week period are then calculated as an average preference for all available time slots—i.e. the participant's preferences and the free time slots are averaged, and these values are sent to the host's diary assistant 1401 as bids for the meeting;

S15.4 The host's diary assistant 1401 combines each of these inputs from the participant's diary assistants 1403, in an attempt to find a day that is agreeable to all participants. The host may calculate a weighted-average of the bids, which may be achieved by weighting each of the bids by a fuzzy function specific to the host. Thus, for example, the host may specify a fuzzy function that has a maximum at Monday 1405, as shown in FIG. 14, and minimum at Wednesday 1407 for the early week period, and each of the bids will be multiplied by such a function. This therefore biases the meeting to the host's preferences;

S15.5 If any of the days within the early morning period results in a zero value, the meeting may not be scheduled on this day, so that ultimately there may be no days available to schedule the meeting within the early morning period. In this case the host diary assistant may review its diary and backtrack to the closest point where there were alternatives to consider. Ultimately, this may require recommencing the process at S15.1, sending out requests for a different period in the week. Alternatively, the host may have a list of preferred attendees, and if one of the zero bids has been generated by an attendee of minor importance, the meeting may be scheduled irrespective of his preference;

S15.6 Once the host's diary assistant has returned a day that maximises the preferences of all participants, the host diary assistant starts the second round of negotiations for a time of day. This may include sending requests for bids for "early morning", "late morning", "early afternoon", etc.;

S15.7 The participant's diary assistants repeat the steps described in S15.2 above, this time deriving a fuzzy function around periods in a single day. Thus, a participant may prefer early morning the most, early afternoon next, and late morning the least. In this case the fuzzy function will have two peaks, one smaller than the other, with a trough in the middle. This will be combined with the participant's free time slots, derived by the assistant directly, and returned to the host diary assistant as the second round bid as described in S15.3;

S15.8 The host diary assistant repeats step S15.4 and may again apply its own preference function for a particular time of day;

S15.9 Once the host's diary assistant has returned a time of day that maximises the preferences of all participants, the host diary assistant starts the third round of negotiations for a specific time. Thus, if the host calculated a maximum preference for early in the morning, the diary assistant may send the times of 08:00, 09:00, 10:00 to the participant's diary assistants. Alternatively, the host dairy assistant may send the prevailing time resulting from its manipulations at S15.8 to the participant's diary assistants, leaving the same to bid for times within that time of day. It is implicit that each assistant 'knows' what hours define these times of day, and even if there is a slight mismatch in interpretation of the hours that constitute a specific time of day, for example, "early morning", it may be assumed that there will be sufficient overlap to enable a meeting time to be scheduled;

S15.10 The participant's diary assistants repeat the step of S15.2, and returns their bids to the host's diary assistant for the time of day as described in S15.3;

S15.11 the host's diary assistant finally calculates the average of the specific time bids, preferably without applying it's own weighting function at this final stage. The time having the maximum preference is returned as the time of the meeting.

Clearly the situation described in S15.5 may occur after receiving bids for time of day and time in the day, and in these circumstances, the procedure outlined in S15.5 may be followed. Thus the host's diary assistant 1401 may back-track to the previous point in the current level of negotiation where there were alternative times available and then try a different time. The above scenario describes three rounds of negotiations, but it is understood that the process may occur over more, or less rounds, depending on the time scale of the initial negotiation (e.g.: try to find a week in a month that suits all participants in the first instance).

Additional features that may affect the participant's preferences include type of meeting (e.g. team meeting, 1:1 meeting, conference, which may require availability over extended periods of time), and this may be factored into the fuzzy preference function specified by the participants. When calculating the maximum preference at each round of negotiations, the host's diary assistant may test the preference against a predetermined threshold, which controls whether or not a time should be selected. In practice, this has the effect of forcing the host's diary assistant to back-track to other days in the week/periods in the day/time in period, depending on at what stage the preference value falls below the threshold, in order to find a time that satisfies the threshold criteria.

Participants of the meeting may not have diary assistants 211, and communication between participants and the host of the meeting may not be effected entirely through Zeus messaging. For example, some participants may be running Microsoft Outlook, or Lotus Notes, which maintains its own calendar function. In this situation there may be provided a shell (not shown) that interfaces with the third party application, and the steps described above (with reference to FIGS. 15a and 15b) may be performed at the shell level. The shell would therefore perform at least three functions—communicating with the third party diary system, processing data received therefrom, and communicating with the host's diary assistant. The latter steps may follow the above procedure, and communication between the shell and third party application may be via email, for example. This may also apply to the fourth embodiment when the task element(s) comprising the task plan are the responsibility of different users.

The diary assistant may also be operable to receive messages from the co-ordinator 305, which messages typically include requests to supply information to the user. The diary assistant may examine the timeslots in the user's diary, and will schedule execution of the request to occur in a free timeslot. If the user has no appointments booked in at the time that the request arrives, the diary will send a message to the co-ordinator to allow the information to be displayed to the user immediately.

Implementation

The diary assistant described with reference to the above examples may be embodied in the following software components:

The functionality of the diary assistant may be co-ordinated through the diary assistant GUI, which may be written in Java (shown in FIG. 7);

The tasks, days and description of tasks may be objects written in Java;

The scheduling, described in steps S9.2, S10.3, S13.2 and S15.2 above, may be written as functions in Prolog or Fril logic programming languages, and these functions may be invoked within a respective Java class;

The graphical interface used for designing plans of tasks in the fourth embodiment may be an editor object written in Java;

The initiation of negotiations and bids from host and participant diary assistants respectively may be handled by Java objects which embed functions, also written in Java, to handle the inputs from multiple participants, according to step S15.4, for example.

It is understood that the use of Java and the logic programming languages are inessential to the diary assistant.

The diary assistant 211 may be run on either a Unix or a Windows operating system (OS), providing the OS is equipped with the relevant components to support Java and either of Fril or Prolog.

When the diary assistant 211 is run on a Unix platform, the following Unix commands may be entered at the keyboard to invoke the assistant 211:

1.1

(i) java oma.agents.ANServer ANS -nogui -t 1 -f n1.db &;

(ii) sleep 10;

(iii) java oma.agents.Facilitator broker -nogui -t 1 -s n1.db &;

1.21
(i) cd diary;
(ii) java -Dia.distrib=$IA_DISTRIB oma.agents.AgentShell Diary -s n1.db -e;
(iii) DiaryAssistant &.
1.1 invokes the processes required for the diary assistants to communicate with each other using the Zeus Open Messaging Architecture supra, and 1.2 invokes the diary assistant itself, and these are thus the commands required for the fifth embodiment.

2
java -Dia.distrib=$IA_DISTRIB DiaryAssistant &
This invokes the diary assistant itself when the first four embodiments alone are run.

The $IA_DISTRIB is a Unix parameter giving the location of files containing information about the user (e.g. name, location for diary files, etc.). If the diary assistant 211 were to be run on a Windows OS, there would be a similar parameter required, but the syntax of the commands listed above may be different.

Email Assistant

A first embodiment of apparatus for processing communications received by a user over a communications link is a software agent generally referred to as an email assistant, which is used to manage both incoming and outgoing emails. As is well known, emails have as a header, information concerning the sender, the recipient and the subject of the email, and this information, which may generally be referred to as identification information, may be used to assess a priority status of the message.

Email has greatly facilitated communication interchange between users connected in a network. However, emails tend to proliferate in number and a user at a particular workstation can be inundated with messages that take a significant amount of time to open and read. Some emails are of crucial importance whereas others are of only marginal interest. It would therefore be helpful to filter emails according to priority. In some conventional systems, emails are given a priority by the sender, but the user can only determine the actual priority by reading the email itself.

The email assistant 205 helps the user to manage both incoming and outgoing email messages. It pro-actively notifies the user of new incoming messages and computes a priority status, which is used to provide advice for handling the message. Furthermore, the email assistant 205 observes differences between how the message is actually handled compared to the advice computed by the assistant, and modifies its parameters so as to reflect the user's preferences.

Figure 16:
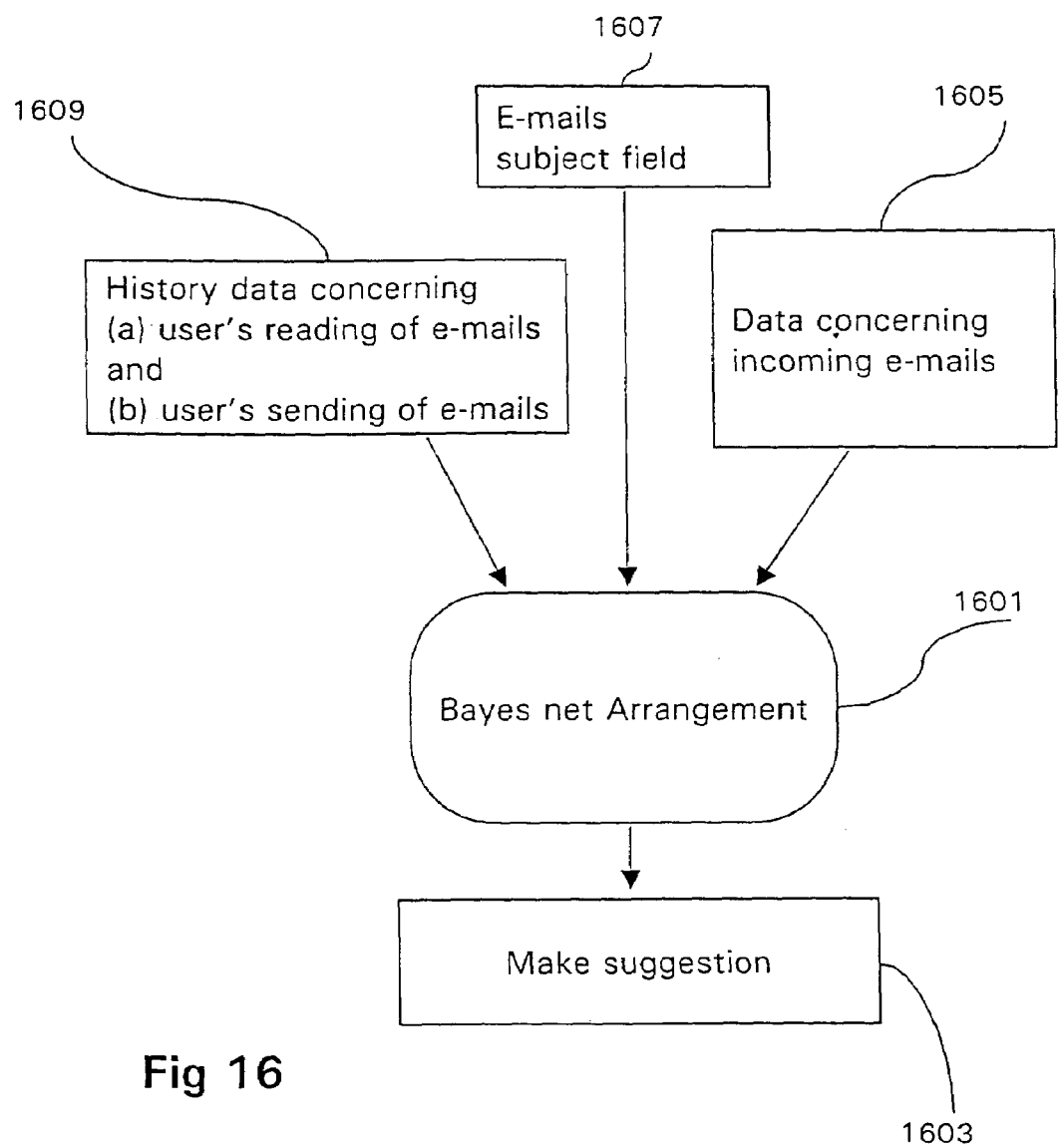
FIG. 16 is a block diagram illustrating operation of the email assistant shown in FIG. 2.

Referring to FIG. 16, the email assistant makes use of a Bayes net arrangement 1601 in order to make a suggestion 1603 as to whether the email is of relatively high or low priority and thus whether it should be read immediately or can be left until a later time.

Figure 17A:
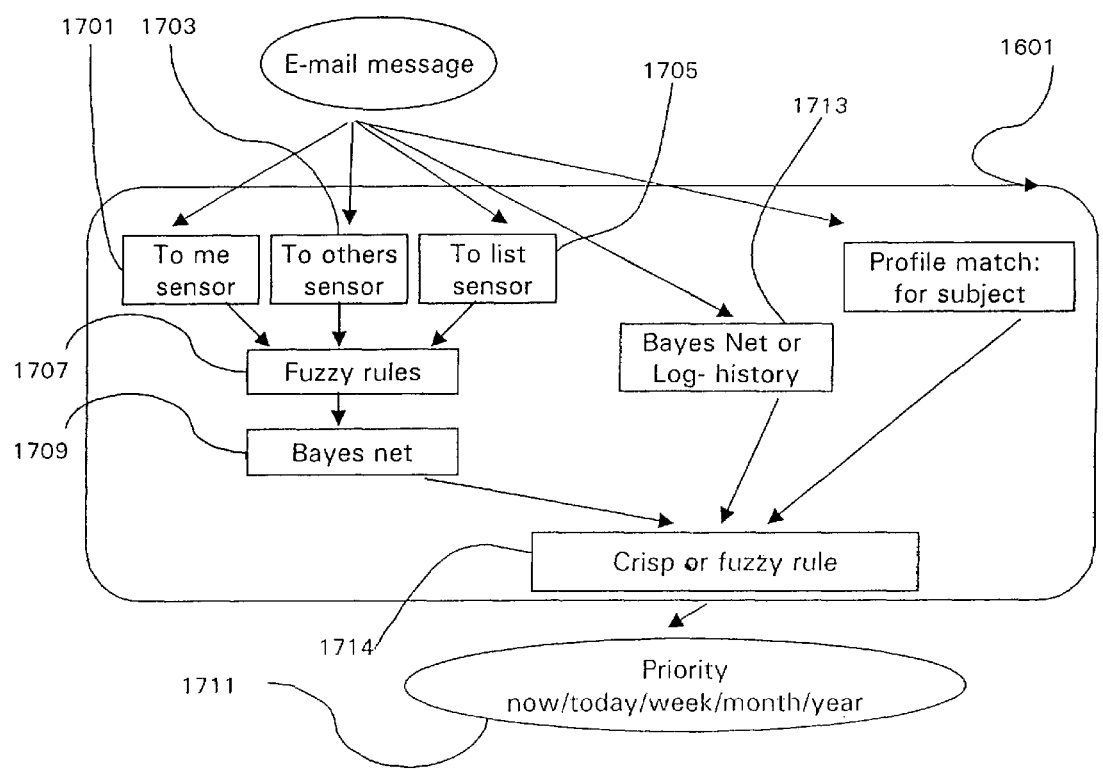
FIG. 17a is a schematic diagram showing internals of a Bayes net arrangement forming part of the apparatus shown in FIG. 16.

The email assistant has the following identification information inputs to the Bayes net arrangement 1601, shown in FIGS. 16 and 17a:

data 1605 concerning the destination address(es) of incoming emails;
data 1607 concerning the importance to the user of the subject matter of the incoming email, as signified by its title; and
history data 1609 concerning the user's previous reading of emails from the sender and the user's previous sending of emails to the sender of the incoming email.

These three analysed inputs provide three parameters by which an email may be prioritised, and the email assistant may make use of various rules in conjunction with Bayes nets, such as fuzzy logic, and/or pattern matching techniques, in order to determine a priority rating for an incoming email. Clearly, the outputs from each of these parameters will be combined to provide a single recommendation for the priority of the email. The emails may then be stored in various lists according to their level of priority—for example:
High, Medium, Low; or
Now, Today, This week, This month, Never.

Address Data:

When an email arrives, the identification information is analysed. Referring to FIG. 17a, and considering analysis of the destination address field, this may be achieved in the following manner.

The string from the message header field (eg "To:") raw data is analysed by logical sensors which return boolean values:

1. To Me sensor 1701: true if my email address appears, false otherwise;
2. To Others sensor 1703: true if there is at least one email address different from mine, false otherwise;
3. To List sensor 1705: true if at least one of the user defined mailing list addresses appears in the string, false otherwise.

The "To Others" sensor 1703 may return a value in [0, 1] defined as 1/(number of other recipients), or some fuzzy sets {Few, Many} may be defined and input into other fuzzy rules, e.g. 1707 shown in FIG. 17a, within the net arrangement 1601.

The "To Me" sensor 1701 may further include an identifier such as a number, which indicates whether the "To Me" address is present in the "TO" field, or the "CC" field, and the priority of the message may be weighted accordingly. There is a further email address category—that of "Apparently to", which is often used by machine generated emails and mailing lists, and this may also have an identifier associated therewith. Alternatively, the identifiers may be boolean values, or there may be one sensor associated with each of the possible recipient "To me" sub-categories ("TO/CC/App- TO").

Figure 17B:
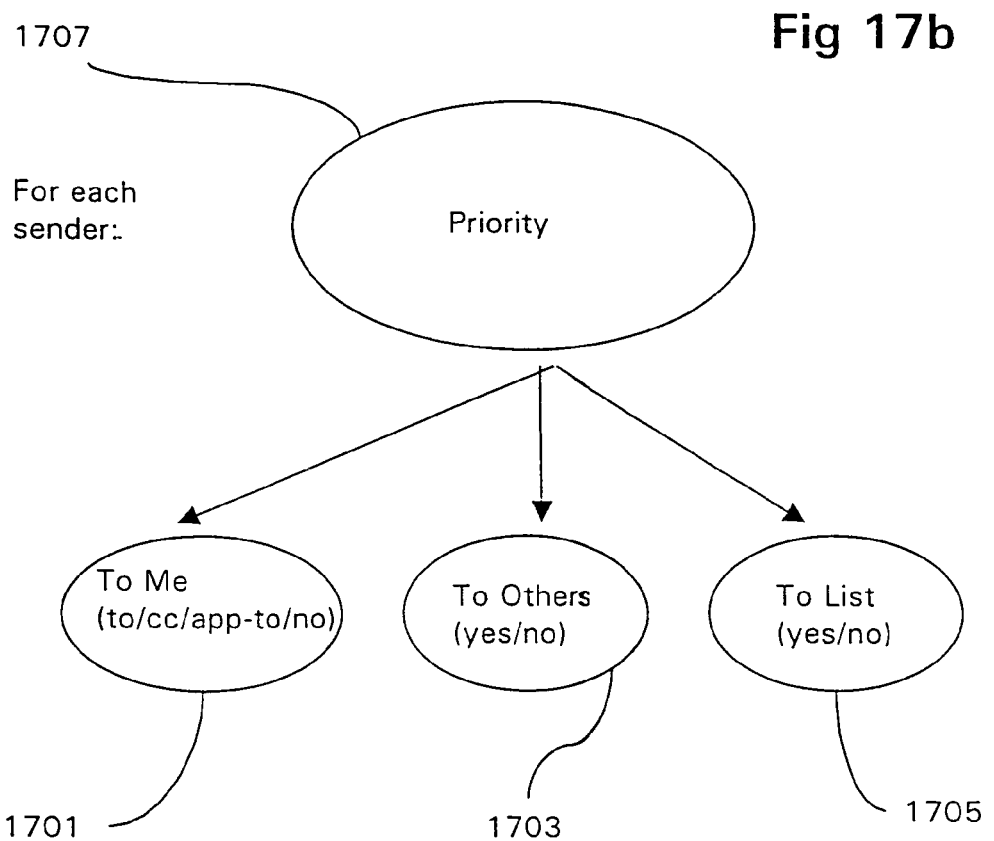
FIG. 17b is a schematic diagram showing a Bayes net for prioritising incoming emails according to address information.

The information provided by the destination address of incoming emails 1605 may be input to a Bayes net 1709, shown in FIGS. 17a and 17b, to compute a priority associated with the sender. As known in the art, a Bayes net considers the causal relation of history data in order to modify the a-priori probability of the occurrence of an event. A discussion of Bayes nets is given by S. Russell and P. Norvig, supra. The email assistant 205 may have one network for each known sender, and a default network for use when an email is received from a sender for the first time. As known in the art, emails can be addressed to an individual address, can be copied to one or more other people and can also be sent using a predefined mailing list, for example to all engineers in a particular company or to a group of customers. In this example, it is assumed that an email addressed solely the user is high priority. It is assumed to have reduced priority if copied to another person. If copied to more than one person, it is assumed to have a lesser priority still. If sent via a mailing list, it is assumed to have an even lower priority.

The priorities associated with the destination address, for a user receiving the e/mail, may therefore be learnt along the lines of:

Message sent to me: Read Now;

Message sent to me and others: Read Today;

Message sent to mailing list: Read this Month;

such that the address field of an incoming email is analysed and propagated through the Bayes net to provide a priority output corresponding to the address field.

However these values, which are based on address information only, provide only a first approximation to how the user would prioritise the emails. In practice, the Bayes net is operable to adapt the weights applied to each of these categories, based on how the receiving user is observed to deal with the email. Thus, the email assistant 205 may suggest that the user should read the email immediately, but in practice, the user may choose to read it later in the day. If that is the case, the assistant 205 should modify the weights in the Bayes net such that the next time an email is received it can anticipate how the user will want to deal with it, and suggest accordingly.

As an alternative to using a Bayes net to determine the priority of an email based on the address field, a ranking factor may be applied to emails (not shown). A ranking factor is defined having a value range between 1 for high importance and 0 for no importance. In this example, the ranking is set equal to:

If the email is directed to the user alone, the email is given an importance ranking=1;

if the email is copied solely to another, the email is given an importance ranking=0.8;

if the email has been copied to several others, the email is ranked with an importance of 0.5;

if the email is part of a mailing list the importance ranking is set to be 0.3 i.e. low importance.

It will be understood that the specific ranking values described above are examples and that in practice, the importance attributed to each particular category of email by the individual user may change with time. As for the Bayes net 1709, the rankings can be learnt over a period of time by monitoring the user's behaviour with respect to the reading of incoming emails. One way of learning these rankings may be to maintain a log of incoming and outgoing emails, and this information may be stored either by the email assistant itself, or in a user profile stored in the database 247.

Figure 18:
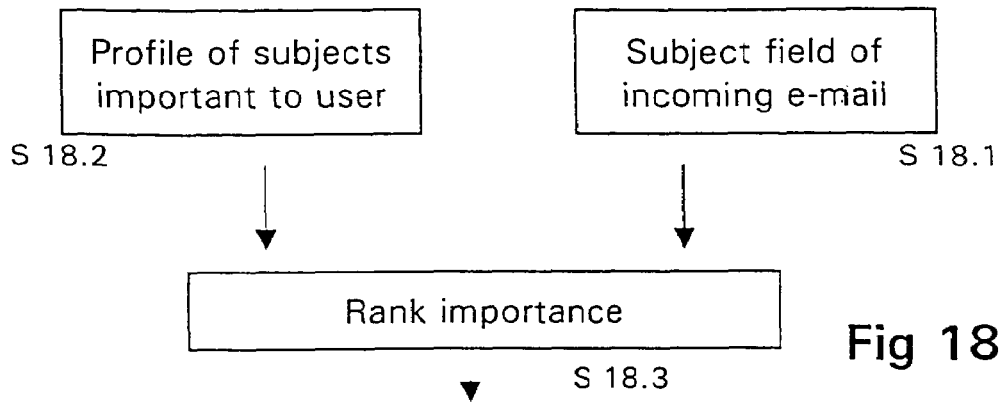
FIG. 18 is a block diagram illustrating a process for ranking emails according to the importance of their subject field to the user.

Subject Data:

The data 1607 concerning the subject field of incoming emails will now be discussed in relation to FIG. 18:

At step S18.1, the subject of the incoming email is detected from its header;

At step S18.2, a profile of important subjects is developed, pertinent to the individual user. For example, if a user has recently sent a number of emails using the same title entered into the subject field, the title of the incoming email is deemed to be important to the user. It will be understood that techniques such as fuzzy recognition or clustering can be used to identify different presentations of the same topic in the subject field;

At step S18.3, the importance of the incoming email is ranked by making a comparison between the profile developed at step S18.2 and the actual subject of the incoming email identified at step S18.1.

The step performed at S18.2 may alternatively or in part be performed by accessing and updating a user profile stored centrally within the database 247. Such a centrally located user profile may include a variety of key words that have been contributed by other assistants, and these may also be used to decide whether the text in the subject field is likely to be of interest to the user.

Figure 17C:
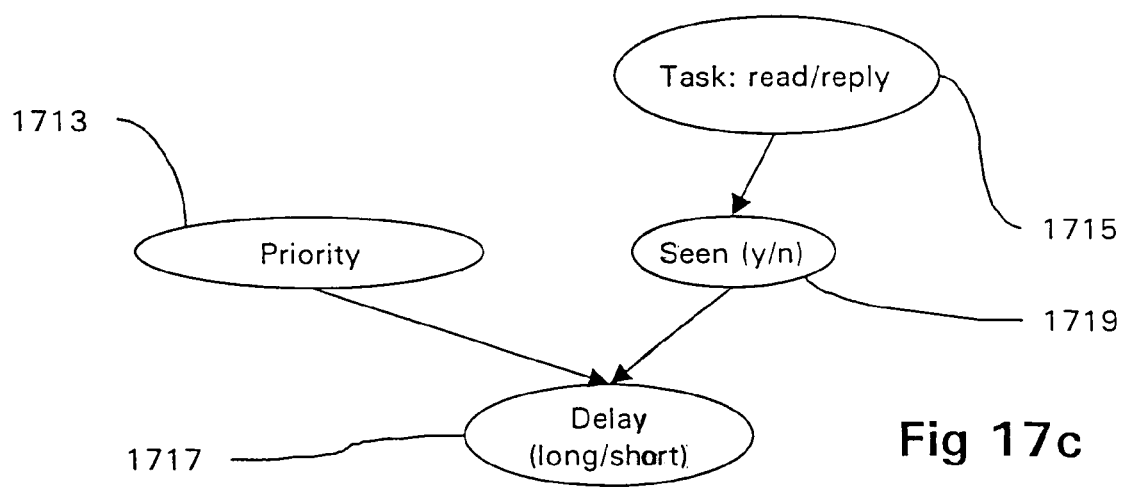
FIG. 17c is a schematic diagram showing a Bayes net for prioritising emails according to user's past preferences for reading previously received emails.

History Data:

Derivation of the history data 1609 from previous emails will now be described. Information relating to the time taken for the user to read or respond 1715 to incoming emails 1605 may be input to a second Bayes net 1713, shown in FIGS. 17a and 17c. This may be combined with the priority information derived from the Bayes Net 1709 associated with the sender, as shown in FIG. 17a at 1714, in order to compute a more refined priority associated with the sender. If an email is read quickly after receipt, this indicates that the user considers emails from a particular sender to be important. If the user has, in the past, taken a long time to read an email from a particular sender after receipt, this indicates that the user considers emails from a particular sender to be of low importance.

The second Bayes net 1713 relates the delay between notification and user action 1717, taking into account the uncertainty in whether, the user has seen the notification or not 1719. The delay between notification and user action 1717 may be derived from a log (not shown) of sent and received emails, as a function of dates and times. This log is maintained by the email assistant 205, and it may be a log private to the email assistant alone, or it may be part of the centrally stored user profile. Thus, the time of receipt and the time of reading of a previously received email can be analysed in order to determine the time between these two actions.

The uncertainty referred to above may result from, for example, a user attending a meeting when the notification arrives. For the duration of the meeting the user is unable to read the email, and any delay in responding to emails that arrive during this time should not be attributed to a preference as a function of the sender. One way of reducing uncertainty is to establish, from the user's schedule, whether the user was occupied during the time of interest (time of interest: time that the email was not read). The email assistant 205 could therefore receive or request inputs from the diary assistant 211, and the date and time information stored in the log file should be checked against times and durations of events scheduled for the user. If there is a delay between receipt and reading of an email during a time when the user was involved in another task such as a meeting, this should be input at the node 1719 of the Bayes net 1713 as "not seen". This could similarly apply to the situation where emails are received, but the user is not logged into a terminal at the time of email receipt (user not in office, user working without computer switched on etc.)

The outputs of this net 1713 and the first net 1709 may be combined 1714 using a fuzzy rule or by taking a weighted average of the respective outputs.

Figure 19:
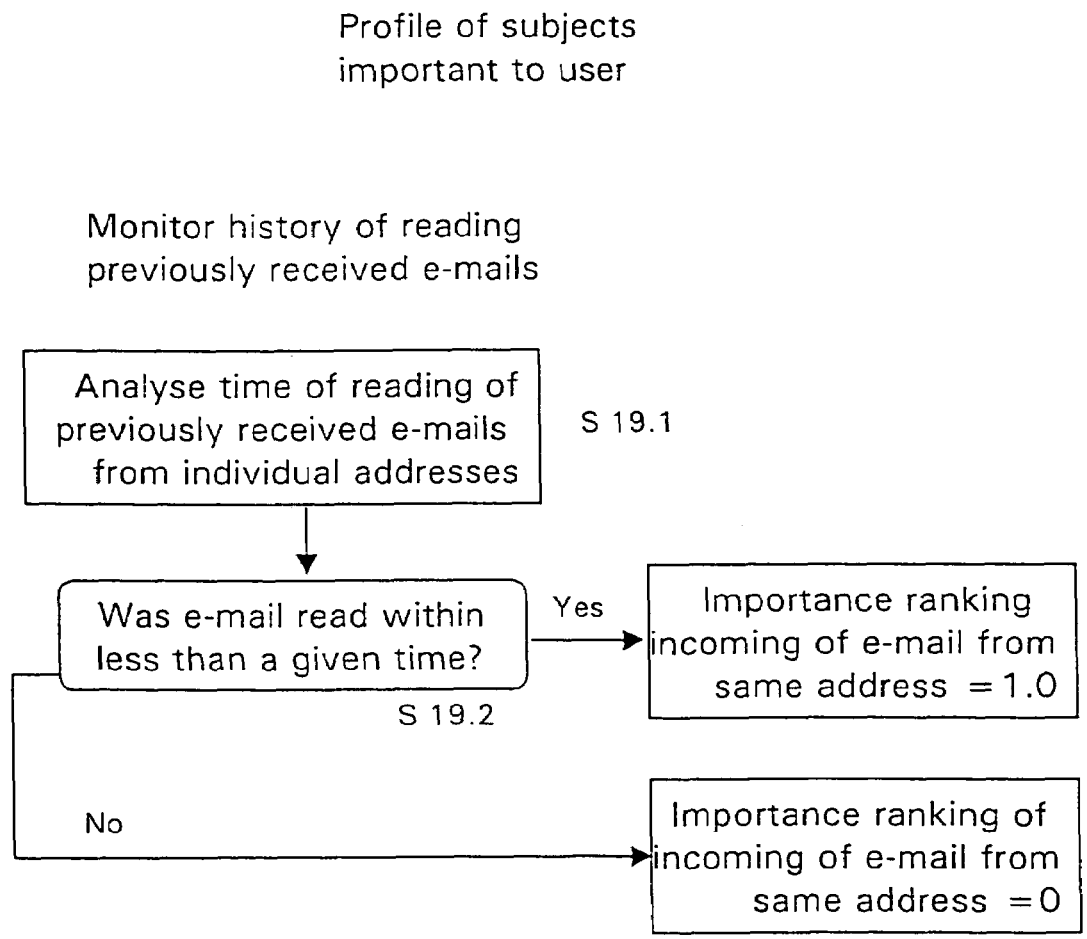
FIG. 19 is a block diagram of a process for monitoring the computer users past preferences for reading previously received emails.

Alternatively, the email assistant may use information stored in the log to calculate a priority based on history data 1609. Thus, referring to FIG. 19:

At step S19.1, an analysis is carried out of the time previously taken to read emails from individual addresses i.e. individual senders.

At step S19.2, when an email from a particular sender is received, a decision is made concerning the time taken to read emails from the sender, in the past. If emails previously were read within less than a given time, i.e. deemed to be important, the incoming email is given a high ranking=1. However, if previous emails from the sender were previously read within greater than the given time, the incoming email is given a low ranking=0.

Incoming emails may also be processed according to previously observed actions of the user. If an email was recently sent by the user to the sender of the current, incoming email i.e. the user is expecting a reply, the incoming email is given a high ranking but otherwise a low ranking. Thus the address and time sent data on the email log is analysed in order to determine when the user last sent an email to the sender of the incoming email. If an email was sent within less than a given time, the incoming email is given a high ranking=1 whereas if an email was not sent within the given time, the incoming email is given a low ranking=0.

Referring back to FIG. 16, the three inputs to the Bayes net arrangement 1605, 1607, 1609 are processed to provide a suggestion 1603 concerning the relative importance of the incoming email, and these are combined to provide a general priority of the email. It will be understood that not all of the inputs are necessarily needed for the net 1601 to make a suggestion 1603. The assistant 205 may store the values corresponding to each sender in a 'Belief vector', which is an array of priority values, typically [Read Now, Read Today, Read This Week, Read this Month, Read Never], which, when added together, equal the value of 1. The element that has the maximum probability indicates the message's priority. The mapping between priority and suggestions is illustrated in Table 1 for a few example suggestions.

TABLE 1

| Suggestion | Message |
|---|---|
| High priority | Suggest read mail now |
| Medium priority | Suggest read mail This Week |
| Low priority | Suggest read mail This Month |

Figure 20:
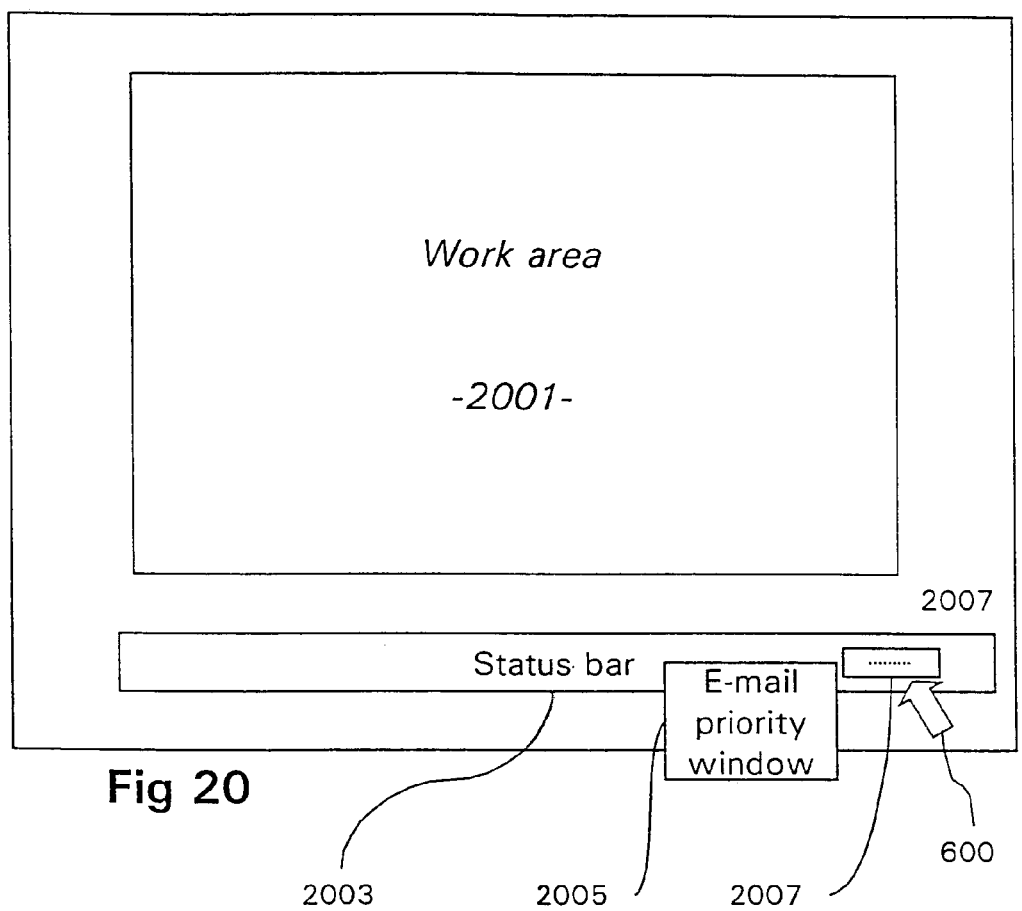
FIG. 20 illustrates schematically means of alerting the user that an email has arrived, in accordance with the invention.

FIG. 20 illustrates how the suggestion message 1603 may be displayed to the user. The screen of display 103 (FIG. 1) is shown with a work area 2001 on which data processing is carried out. The status bar 2003 is shown below the work area. Thus, the user may be operating a word processor to prepare a document. When an incoming email is received, a mail icon 2007 is displayed on the status bar 2003. This indicates the arrival of the email but not it's content. Thus, the user must decide whether to stop word processing and open the newly arrived email or whether to continue word processing. If the email is of peripheral importance, it would be better to continue with the word-processing rather than break concentration. In accordance with the functionality provided by email assistant, the user moves the mouse cursor 2006 onto the mail icon 2003, which results in a mail priority window 2005 being displayed. The mail window 2005 may contain a message selected according to Table 1 above, depending on the suggestion 1603 made by the Bayes net arrangement shown in FIG. 16, along with the sender's details, the size and subject of the email, and may list the recipients(s).

Thus, if the incoming mail is suggested to be of low priority, the user is immediately informed of this fact and can continue word-processing. However, if the email is suggested to be of high priority, the user can stop word-processing and open the newly received email message. The message in window 2005 is a suggestion only and thus can be overridden by the user if deemed appropriate.

The communication of email arrival may be further controlled by priority thresholds. For example, message 2005 may be controlled such that it only displays when the priority exceeds a certain value, or satisfies a certain condition (such as the subject field includes "READ NOW"). This feature may be particularly useful as it allows the user to work substantially without interruption, but addresses the need to notify the same of urgent, or specifically categorised tasks. The above procedures for assigning and updating priority status to an email may be illustrated by the following example:

- A message arrives and is analysed according to the above mechanisms, based on the three identifying parameters;
- The probability distributions output from the Bayes Net and/or rules are used to compute a priority, which is thus a combination of results from analysing all three input parameters, and may be identifiable from the belief vector;
- The priority is output from the email assistant 205 to the user, together with a suggestion based on the priority value;
- If the priority is Read Now, and the user chooses to read the message later in the day, the message is routed to the 'Read Today' list;
- The email assistant 205 learns how the user has handled the message, and the 'Read Today' element is given more weight for that sender and/or subject field in the relevant input parameter computing mechanism (e.g. Bayes net—address list, history data; fuzzy logic rule—address);
- The next time a message arrives with corresponding features, the email assistant 205 computes a new priority based on the user's preference learnt during the previous interaction.
- Ultimately the email assistant 205 may learn the user's behaviour and reaction to messages of computed priorities, in order to automatically organise and sort incoming messages based on the learnt behaviour.

The email assistant 205 may have a user interface (not shown), which may be represented as a dialogue box or the like, and which allows the user to view the emails in lists corresponding to the priority ratings listed above. The user may thus scan through a category of emails by selecting the relevant list, which may be accessible via pop-up menus or their equivalent, and then selecting an email for reading. The user interface may also offer some of the standard features of standard email systems, such as a 'Compose email' option.

Figure 21:
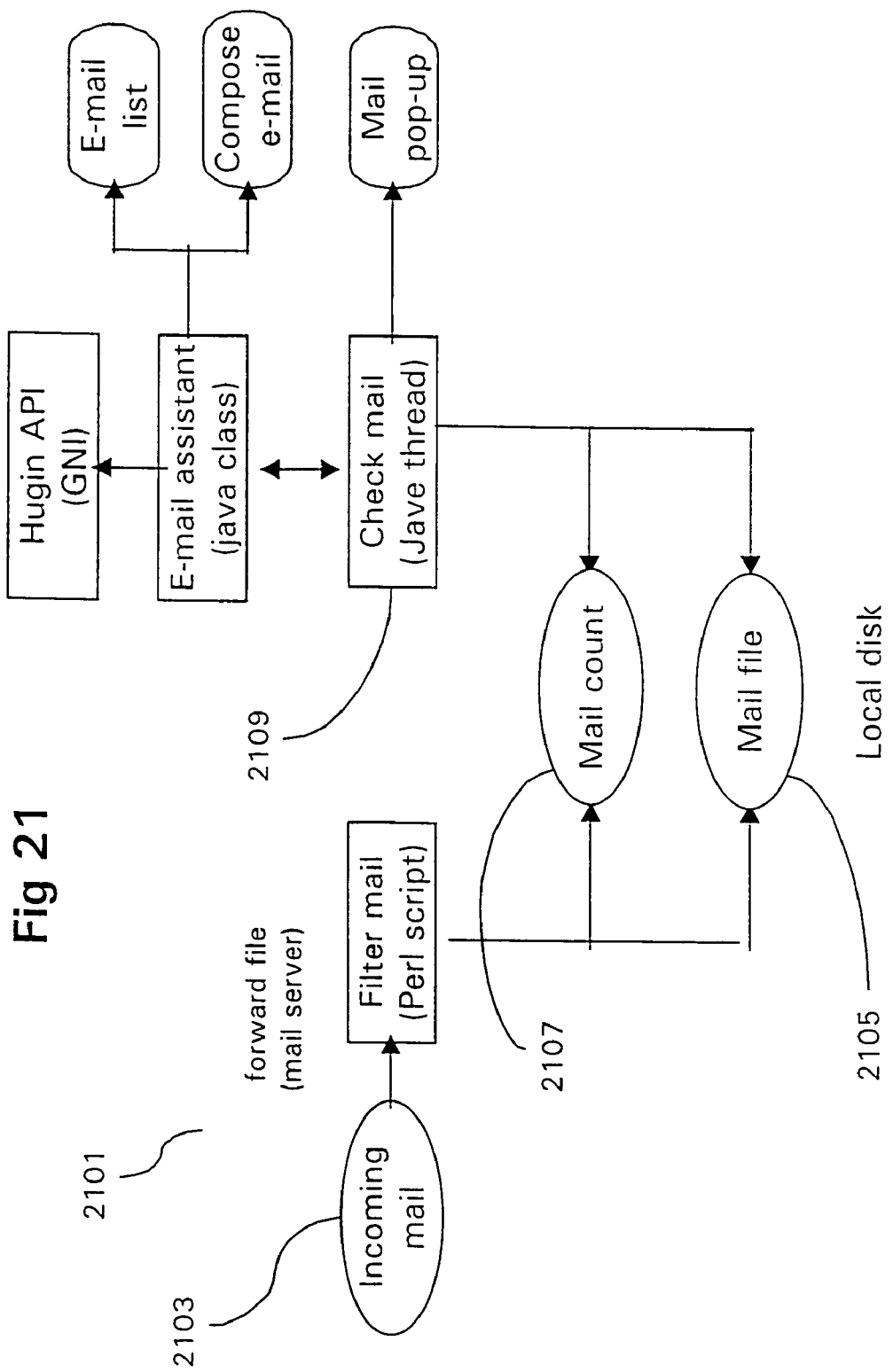

Implementation:

FIG. 21 shows a schematic diagram of a typical Unix implementation of the email assistant 205. Incoming emails at the mail server are picked up by calling a PERL script in a forward file 2101, which is a standard mechanism used to forward emails to predetermined locations, for each message 2103. It has the effect of running incoming mail through the commands of the script rather than allowing the mail to sit in the in-box. The script copies the message 2103 onto a local disc 2105 with an internal number and concurrently updates the current mail count 2107 in a file stored on the local disk. This process is event-driven and provides the interface between the email assistant 205 and the Unix platform. The email assistant 205 may be written in Java, and may thus have a plurality of threads that are capable of running concurrently: A Java thread 2109 may be used to check the mail count periodically, such that when a change is detected, the corresponding message 2103 is retrieved using the email number 2107.

Thus, the load on the mail server is reduced through delegation of the reasoning process to the local machine (client machine) that the email assistant 205 is running on.

Telephone Assistant

A second embodiment of apparatus for processing of communications received by a user over a communications link is a telephone assistant, which is generally similar to the first embodiment described above, for which a description of the operative terms has been given. The telephone assistant 207 is used to manage a user's incoming telephone calls by performing call screening on incoming phone calls. The calling line identifier (CLI) of incoming calls may generally be referred to as identification information of the phone call.

Figure 22:
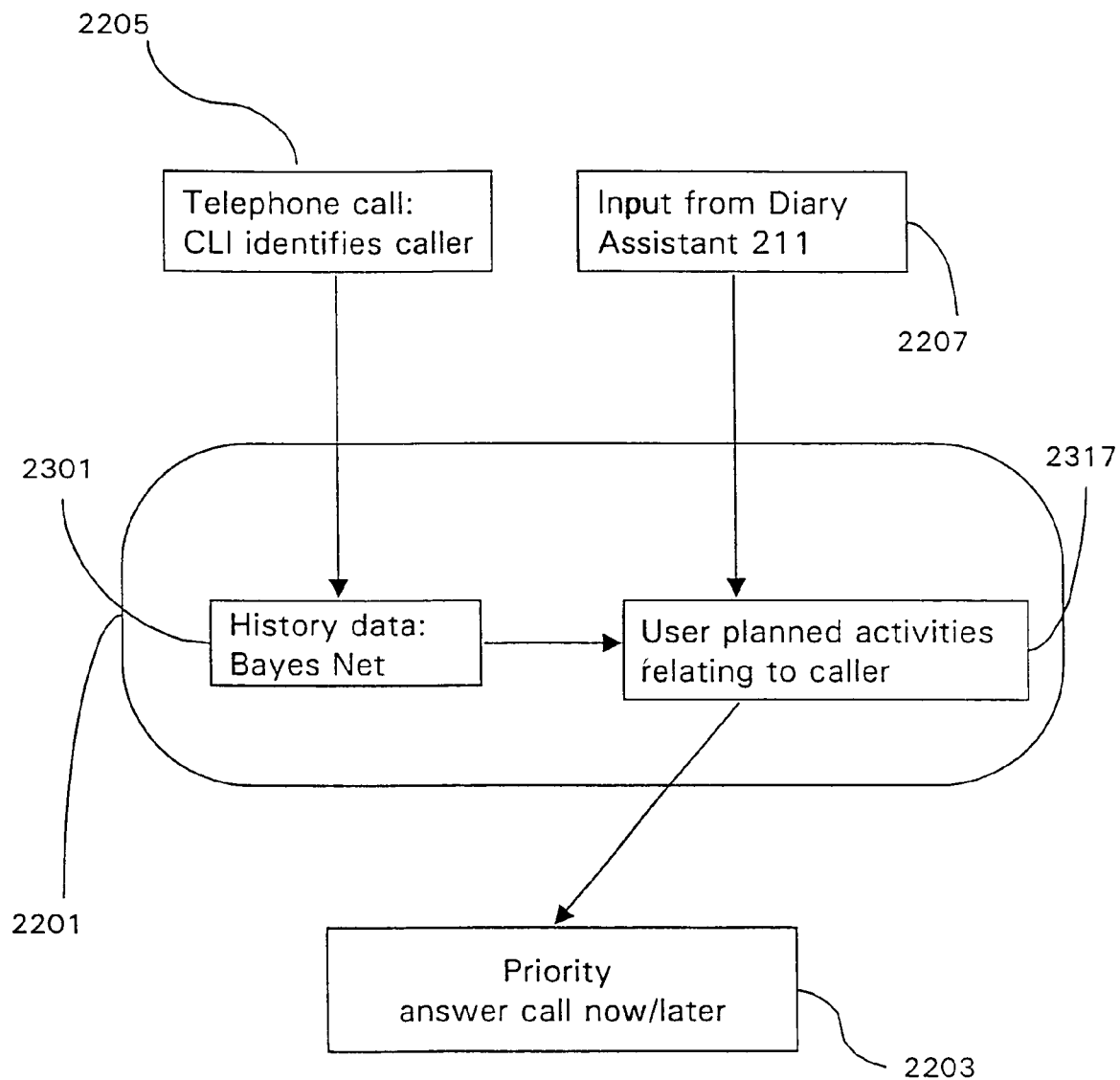
FIG. 22 is a flow diagram for controlling answering of incoming telephone calls, illustrating operation of the telephone assistant shown in FIG. 2.

Referring to FIG. 22, a Bayes net arrangement 2201 can be used to restrict answering of incoming telephone calls. Data derived from the CLI 2205 and data from the diary assistant 2207 is fed into the net 2201 as shown in the Figure and an output 2203 is provided to control answering of incoming telephone calls.

Figure 23A:
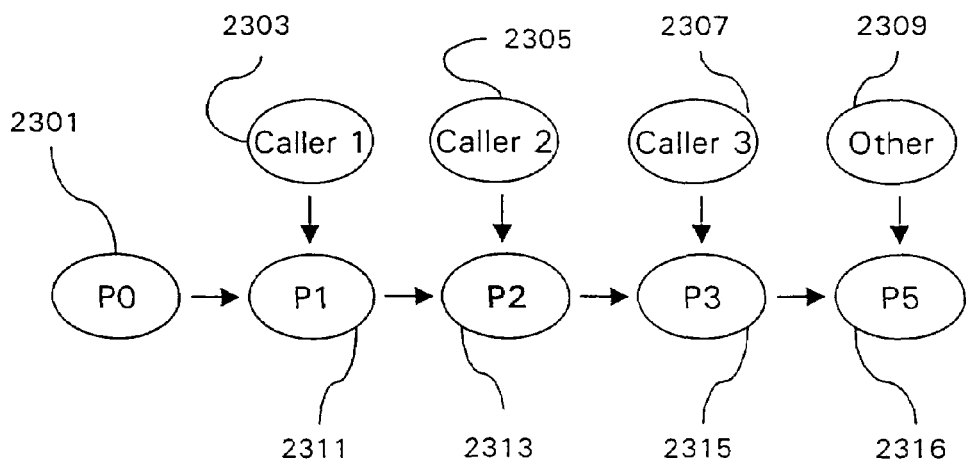
FIG. 23a is a block diagram illustrating a tree Bayes net used to calculate a priority associated with each caller.
Figure 23B:
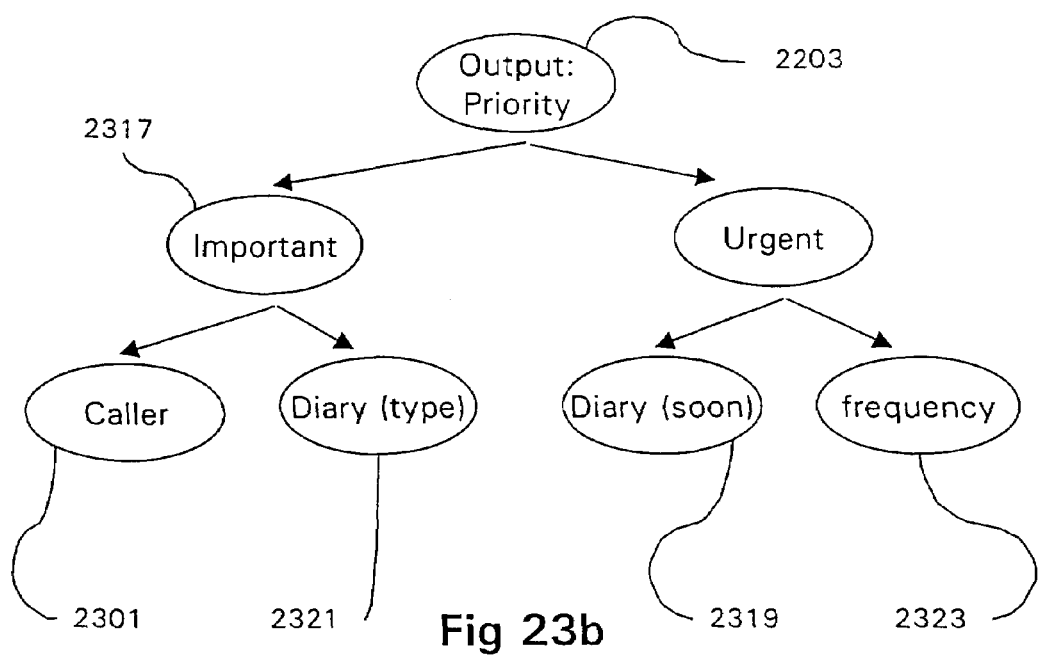
FIG. 23b is a block diagram illustrating a further Bayes net, which takes as inputs the outputs from FIG. 23a, together with information relating to user activities.

Referring to FIGS. 22 and 23a, the priority associated with each caller may be represented in a Bayes net 2301 tree, located within the arrangement 2201, where each branch of the tree 2301 represents a caller that the user may expect to receive a call from 2303, 2305, 2307. There may be an additional branch, represented as 'other' 2309 in FIG. 23, which is used as a default to filter calls from unknown callers. The CLI of incoming calls may be used as identification data in the Bayes net 2301, such that when an incoming call is received, the telephone assistant 207 uses the CLI to search a database for the corresponding name of the caller. This database may be either stored within the telephone assistant or within a user profile, preferably located centrally in the database 247, to be accessed by the telephone assistant 207.

The conditional probabilities 2311, 2313, 2315 of the Bayes net tree 2301 are initially set so that all of the calls are accepted. The telephone assistant 207 can then observe how the user manages the calls, and refine the probabilities within the Bayes net tree 2301 in a manner similar to that described in the first embodiment.

The Bayes net arrangement 2201 may also receive data 2207 from the diary assistant 211, relating to diary entries which indicate that the user has planned certain activities relating to the caller identified as described above. This data is incorporated in a second Bayes net 2317, shown in FIG. 23b, which is also located within the arrangement 2201. The second net 2317 has, as inputs, the importance of the call based on the caller's identity, which is input from the Bayes net tree 2301, together with information relating to whether or not the user has a meeting scheduled with the caller. This information may be further categorised by proximity of meeting, meeting type and frequency of calls:

Time of the meeting in relation to time of the call 2319. This information may be available via the diary assistant 211, and passed to the telephone assistant 207 via the message passing described earlier;
Is the meeting work or play-related (e.g. business meeting or leisure meeting) 2321;
How frequently the caller makes calls to the user 2323. This information may conveniently be stored in the database, against the caller's ID details.

Furthermore, the diary may contain a diary entry indicating that a call is expected, in which case the net 2317 takes this into account when prioritising the incoming call. Also, the diary may indicate that at a particular time, the user is uninterruptable, in which case call answering will be barred automatically. This information may be incorporated into the second Bayes net 2317 in a similar manner to that described above for the type of meeting 2321.

When a call is received, and the above information has been extracted and processed in the second Bayes net 2317, the telephone assistant 207 outputs a recommended priority status. This is shown in FIG. 22 as the suggestion for call to be answered at 2203.

The assistant 207 may operate in three modes:
Accept calls,
Refuse calls,
Filter calls according to the priority analysis output from the Bayes net arrangement 2201.

Figure 24:
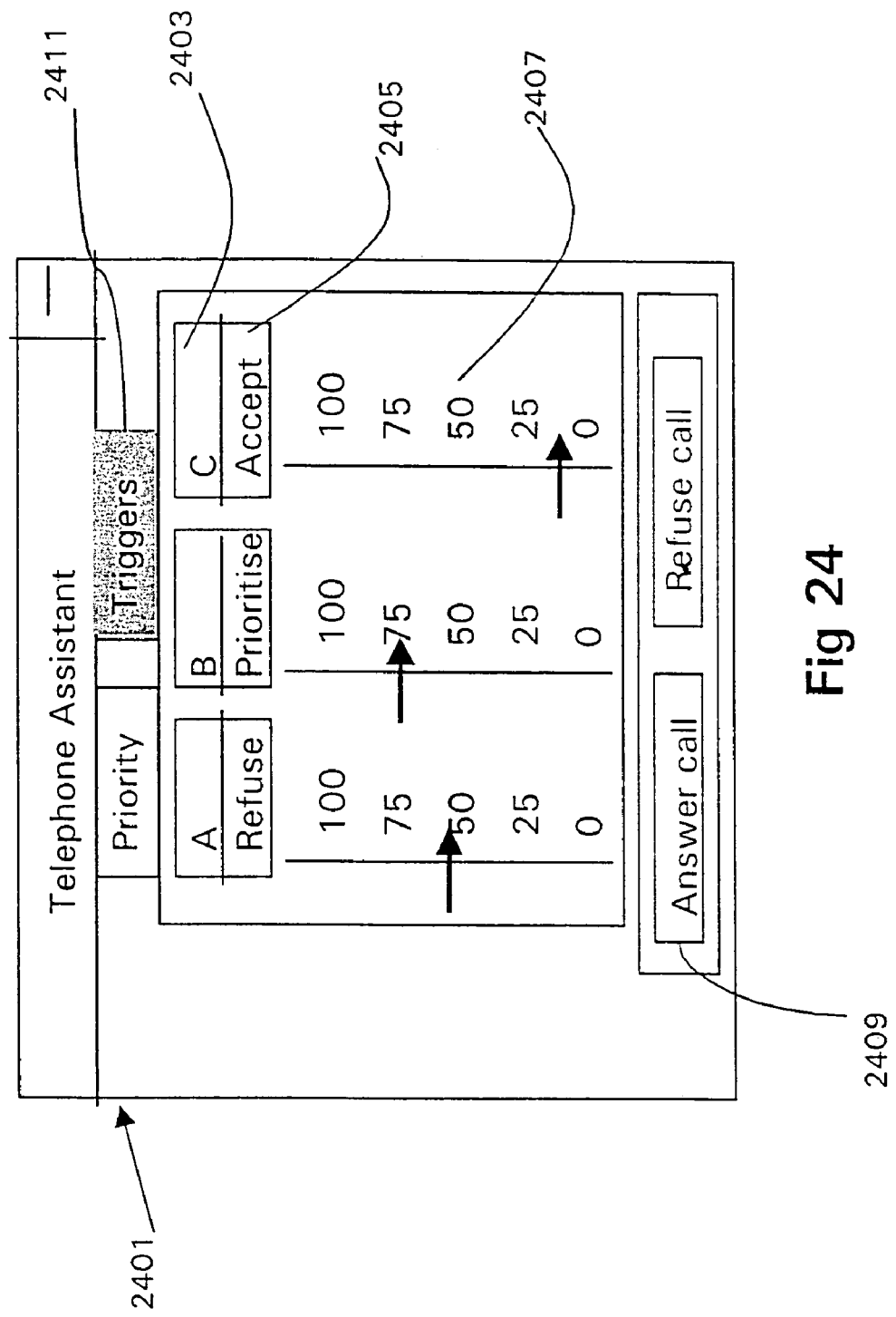
FIG. 24 is a schematic view of the display provided by the telephone assistant.

The operating mode may be selected via a graphical user interface 2401 such as that shown in FIG. 24: the caller ID is detailed in 2403; the mode of call acceptance is selectable from a pick list at 2405; and the selected priority threshold is displayed at 2407. The assistant 207 provides the user with a further option of accepting or ignoring the call at 2409. The interface may contain a keypad to dial phone numbers directly, and a text field where the user can type the name of the person to call.

If the assistant is set to operate in either accept or refuse calls mode, the user effectively overrides the assistant's computations. If the assistant is set to operate in filter call mode, then calls will be announced to the user as a function of the computed priority compared to the selected priority, at 2407.

In the refuse calls mode or filter mode, the telephone assistant 207 can instruct the interface 115 shown in FIG. 1 to inhibit ringing of a telephone, so as not to interrupt the user unless the incoming call is analysed to be of a predetermined importance. In this situation, the incoming call may be diverted to a messaging service.

The user can also set triggers in, the trigger tab 2411 of FIG. 24 by associating a pre-recorded message with a caller's name or number. When a new call arrives, the assistant 207 checks for existing triggers and fetches the corresponding message. This message is then automatically played to the caller.

The above procedures for assigning and updating priority status to a phone call may be illustrated by the following example:

The assistant 207 translates the number with the name of the caller in the database, then checks for triggers;
Assuming no triggers have been set for this caller, the assistant computes a priority for the call by inputting caller information, frequency of calls received from a person, diary information into the Bayes net arrangement 2201. This information is propagated through the net to provide a priority;
Assuming that the user interface 2401 has been set to 'filter emails' at 2405, this computed priority will be compared to the selected value and the call processed accordingly.

Implementation

Figure 25:
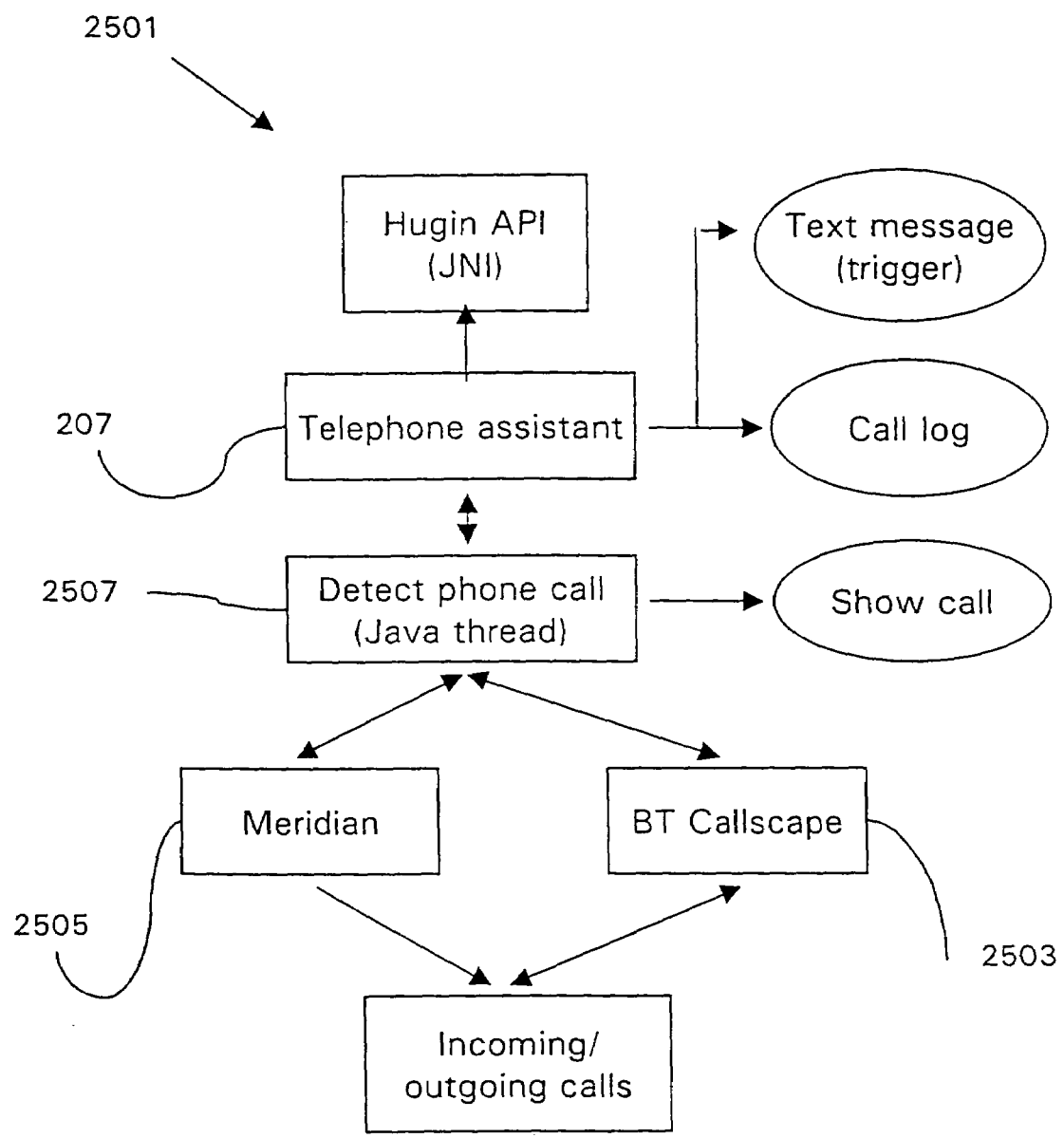
FIG. 25 is a schematic block diagram showing implementation features relating to the telephone assistant shown in FIG. 2.

One implementation 2501 of the second embodiment uses BT Callscape® 2503 to interact with a Public Service Telephone Network (PSTN) analogue telephone line, as shown in FIG. 25 of the accompanying drawings. Callscape is a product of British Telecommunications Public Limited Company which provides computer telephony integration (CTI) and calling line identification (CLI). It is available as an external hardware device that connects to the serial port of a computer. Telephony events (lifting of receiver, receiving incoming calls, sending outgoing calls) may be processed by an application running on the computer. The telephone may be a Meridian® digital phone 2505, which uses a Meridian Communication adapter as a hardware board located in the telephone handset, which also connects to the serial port of the computer.

The assistant 207 may be implemented in the Java programming language, and the arrival of a phone call may be detected by a thread 2507, which provides a server front end to the Callscape client. The assistant 207 may interface with Callscape 2503 via an ActiveX component having a Visual Basic layer to initiate connection to the telephone assistant server. Incoming calls are thus signalled to the thread, which then notifies the telephone assistant 207 with the CLI.

Multi-Modal Interface

Referring to FIGS. 1 and 2, apparatus according to an embodiment of apparatus for identifying user activities at a workstation may be provided by a multi-modal interface 209 arranged to identify such activities.

A multi-modal interface 209 is provided between two separate entities, a human and a machine, which are physically separated, but are able to exchange data through a number of information channels or modes, such as via a keyboard 101, display screen 103, mouse 105 and an audio channel 113. The multi-modal interface 209 is primarily used to process what a user explicitly communicates to the machine, but it may also extract information implicitly, by observing user actions. This may be described as obtaining high-level information about the user by observing low-level modalities, such as the keyboard 101 and the mouse 105, and this information may be used to provide user-friendly interactions and additional functionality.

Figure 27:
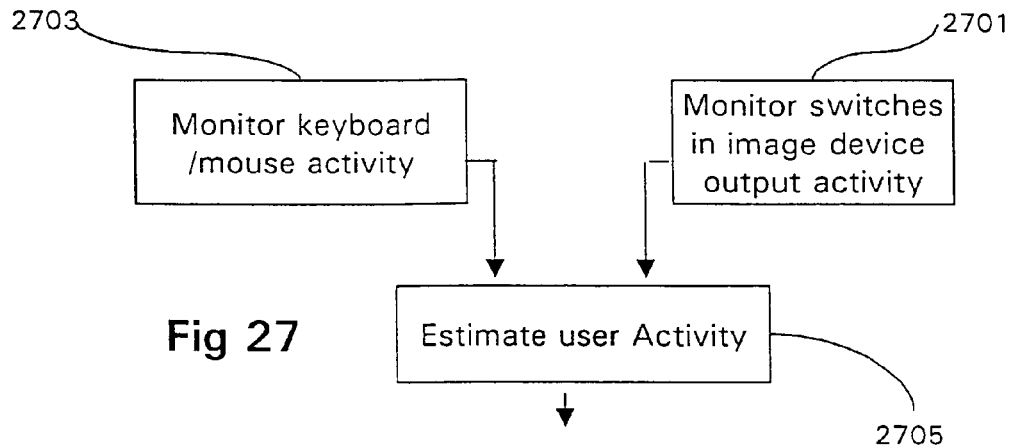
FIG. 27 is a schematic flow diagram of a process performed by the multi-modal interface shown in FIG. 2.

Multi-Modal Interface: Detecting User Presence:

Referring to FIG. 27, a first embodiment of the present invention is concerned with detecting whether or not the user, is present at a workstation. In order to achieve this, two data sources 2701, 2703 are input to the user activity data processing step 2705. The first data source is provided by an imaging device 114, and the other of the data sources 2703 is provided by data from the keyboard 101 and mouse 105.

Figure 26:
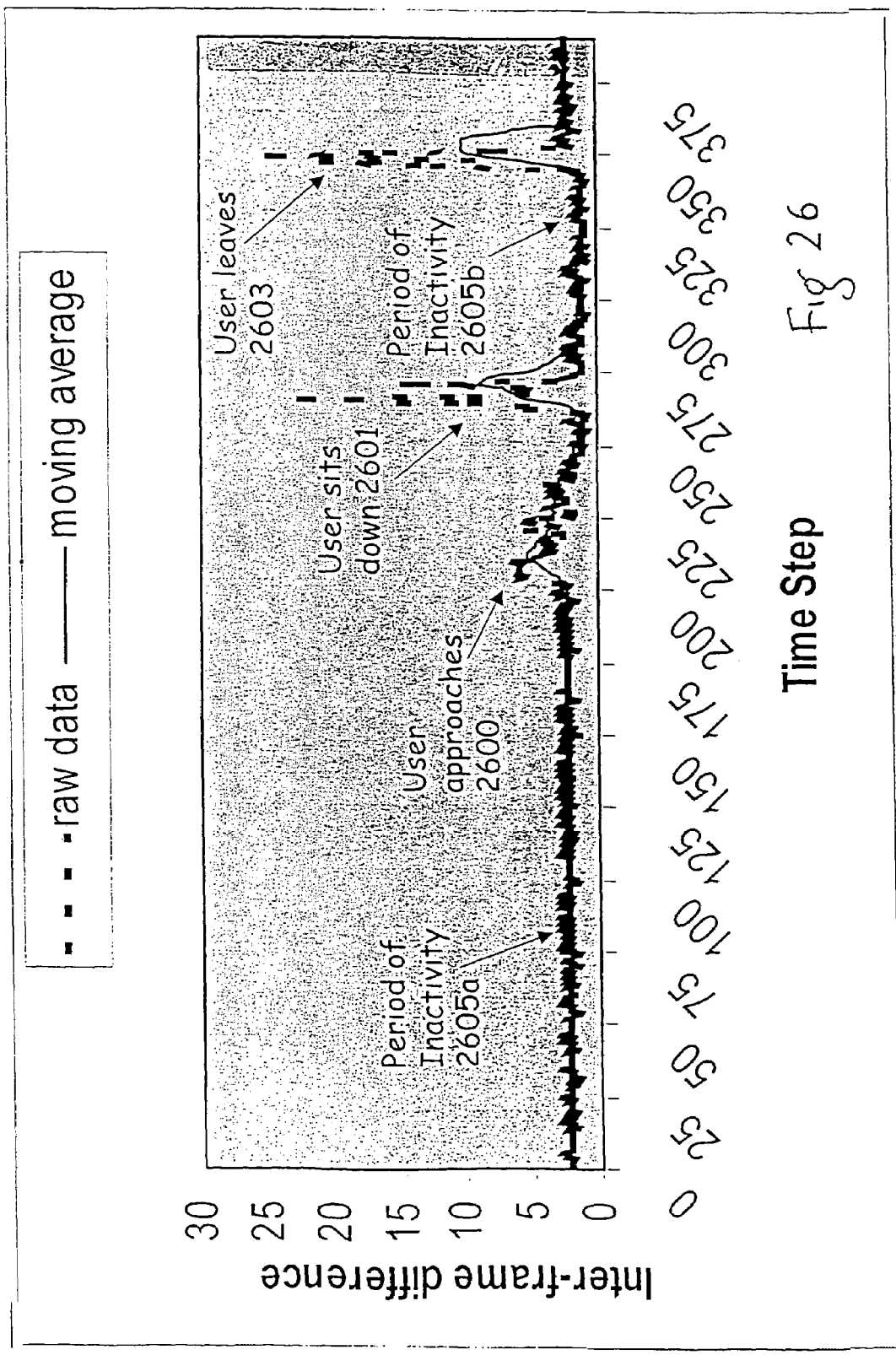
FIG. 26 is a graph of the output of the video camera providing the imaging device shown in FIG. 1.

Referring to FIG. 26, the first of the two sources 2701 outputs a signal indicative of discontinuities 2601, 2603 that occur when a user enters and leaves the vicinity of the workstation. FIG. 26 presents inter-frame difference recorded by an imaging device such as a video camera as a function of time, and illustrates a user firstly approaching the workstation, sitting next to it ready for use and then leaving the vicinity of the workstation. The approach of the user produces an initial upward step 2600 in the output of the camera and then as the user becomes positioned next to the workstation ready for use, a pulse 2601 is produced. Thereafter, the output settles to a relatively steady level 2605b. When the user leaves, another pulse 2603 is produced in the output.

As can be seen in FIG. 26, the level that occurs whilst the user is present 2605b, using the workstation, is much the same as when there is no-one present at the workstation 2605a. It is therefore difficult to determine from the output whether the user is present or absent from the workstation. The second data source 2703 is thus used in conjunction with information from the first data source 2701 in order to differentiate between user absence and user presence.

The second data source 2703, may be provided by either or both of the keyboard 103 and the mouse 105, and data may be retrieved from these inputs by monitoring their usage by monitoring means (described below). Briefly, the monitoring means comprises sensor detectors, which are operable to detect usage of various types of key and mouse actions, and are further operable to calculate a rate of operation of these actions over a predetermined period of time.

Figure 28:
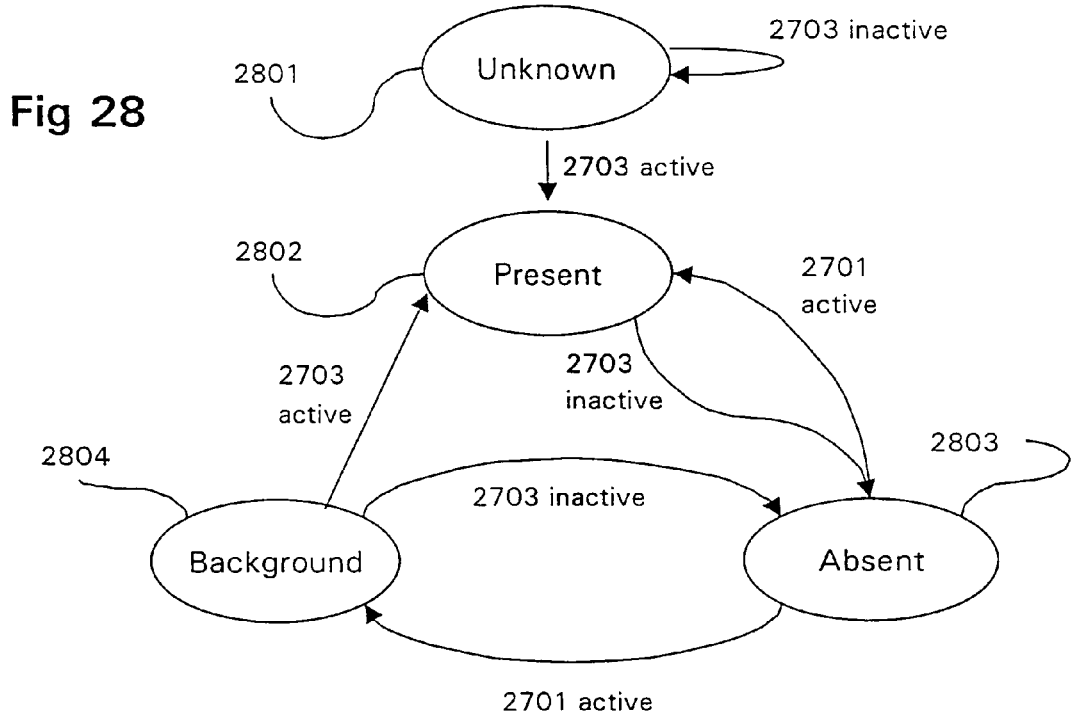
FIG. 28 is a schematic diagram of various user states detected by the process shown in FIG. 22.

FIG. 28 shows how the information extracted from the first and second data sources 2701, 2703 are combined in order to distinguish user presence in the flat periods 2605a, 2605b shown in FIG. 26:

2801 The initial state is Unknown. In this state only inputs from the second data source 2703 are considered;

2802 The state is set to Present when the monitoring means detects activity from the second data source 2703;

2803 The state is set to Absent when no input is detected from the second data source 2703, but activity is detected from the first sensor 2701. When in the absent state, the second data source 2703 takes precedence over the first data source 2701;

2804 The state is set to Background after reaching state 2803 when further activity is detected from the first sensor 2701 but no change of state is detected from the second data source 2703. If the second data source 2703 persistently fails to detect any activity 2806, the system will return to the Absent state, but if activity is detected at the second data source 2703, the state is set to Present.

Multi-Modal Interfaced—for Activity and State of Mind Detection

The low-level data inputs described above can also be used by the multi-modal interface 209 to provide high level data such as the level of stress exhibited by the user. Data from low level inputs will be dependent on the activity carried out by the user, his familiarity with using the inputs and his reaction times and perceptual acuity, among other factors, and these should be taken into account when determining stress levels from such data. The following is a description of data measurement and processing by the multimodal interface for the purpose of state of mind detection in addition to activity.

Figure 29:
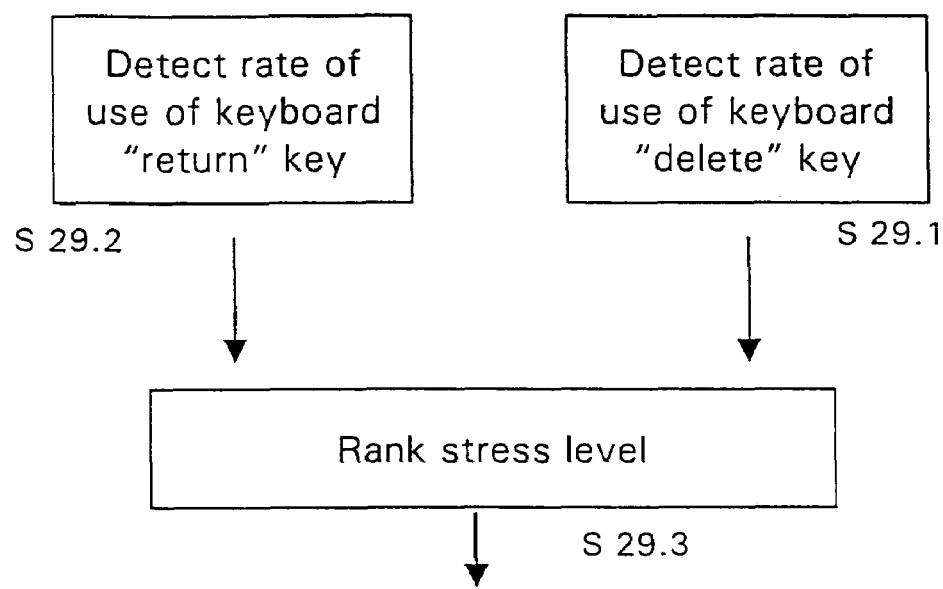
FIG. 29 is a block diagram illustrating a process for ranking the stress level of the computer user.

When the user has been detected as present, as described above with reference to FIG. 28, data inputs 2703 from both the keyboard 101 and the mouse 103 may be analysed in terms of, for example, frequency and mode of use thereof. The following presents a brief overview of how the system estimates user activity with reference to FIG. 29 of the accompanying drawings. The components effecting the querying and quantifying of data are described thereafter: Every few seconds, the low-level sensors are queried for the frequency of use of each type of keys:

1. S29.1 Detect the rate at which the user operates, for example, the "delete" key. For example, usage of the delete key at a relatively high rate may indicate that the user is making many mistakes which in turn may indicate that the user is under high levels of stress;

2. S29.2 Detect the rate at which the user operates a text key, in this case the "return" key. Heavy use of the return key □ indicates a high error rate and hence, possibly, high stress. Use of other keys such as control keys and mouse movement can also be analysed in order to detect usage, as an indication of stress, at step S29.2.

Current values are compared with user-independent values via predetermined rules to determine the activity.

One way of implementing such monitoring is illustrated in FIG. 30, which shows a plurality of monitoring means 3001, 3003 corresponding to monitoring of text keys (such as the "return" key) and delete keys respectively. Each of these monitoring means gathers information from sensor, frequency and time-out detectors.

FIG. 30 shows monitoring means for monitoring two events—text key usage and delete key usage 3001, 3003. Other events, such as those listed below, may similarly be detected by corresponding monitoring means (not shown in a Figure):

Text keys usage 3001;
Delete keys usage (includes backspace key) 3003;
Control keys usage (includes 'end', 'home', 'page up' etc.);
Mouse motion;
Mouse drag speed;
Mouse click usage;
Mouse motion and drag directions.

Referring to the two monitoring means shown in FIG. 30, the sensor detectors 3009, 3015 detect events relating to use of the text and/or delete keys. The frequency detectors 3011, 3017 receive information from the sensor detectors 3009, 3015 and thereby monitor rate of use of the above events in real-time. The time-out detectors 3013, 3019 similarly receive information from the sensor detectors 3009, 3015 in order to determine whether an event has occurred during a given period of time. The frequency detector may use time-stamped information from the sensor detector together with data from the time-out detector in order to detect determine levels of use (including periods of inaction) of the inputs.

In operation, and with reference to the delete key monitoring means 3003, a delete key detector 3015 sends the timestamp of each delete key stroke to a frequency detector 3017 which determines the rate at which the delete keys are being used. Data recorded by a corresponding time-out detector 3019 may be combined with information from the frequency detector 3017, and the frequency detector may perform a statistical analysis thereof. The statistical analysis may include computing an average of timestamp differences between events, shown at step S29.3 in FIG. 29, and this data is used to rank the stress level of the user.

It will be understood that the system can monitor the usage of the delete key and the return key under all conditions and thus determine an average rate for the user. This average rate may be stored and updated in a user profile, which may be accessible from the co-ordinator assistant 305, shown in operative association with the multi-modal interface 209 in FIG. 2, so that when the usage rate exceeds the average significantly, a condition of high stress is indicated. For example, the following algorithm may be applied to assess the user's current level of stress:

Assuming that the current user activity is writing

---

| IF | (Current text speed > Average text speed) & |
| | (Current mistake speed > Average text speed) |
| | THEN |
| |     State = high stress |
| | ELSE IF |
| |     (Current text speed <= Average text speed) & |
| |     (Current mistake speed > Average mistake speed) |
| | THEN |
| |     State = tired |
| | ELSE |

-continued

State = normal

---

This can be quantified by a stress ranking which may range between 1 and 0, where 1=high stress and 0=normal.

As described above, the state of mind of the user is determined in the context of the current user task, and the low-level inputs may further be used by the multi-modal interface 209 to determine high level information such as the task defining the user activity.

Accordingly inputs from the text keys, delete keys, and control keys (not shown) and from the mouse (not shown), may be monitored by monitoring means as described above with respect to FIG. 30 for type and frequency of use. Considering the operation of text sensor detector 3009, the timestamp of each text key is sent to a frequency detector 3011, which determines the rate at which the text keys are being used. Data recorded by the corresponding time-out detector 3013 may be combined with information from the frequency detector 3011 as described above, and the resulting statistical quantities may be compared with base values, which are user independent, according to the following rules:

---

| IF | Text speed is HIGH (compared to base value) & |
| | Mistake speed is HIGH & |
| | Control key usage is HIGH |
| OR | |
| | Text speed is VERY HIGH (compared to base value) |
| THEN | |
| | TASK = WRITING |

---

Where HIGH and VERY HIGH are predetermined levels and may also be specified in the user profile, but are user-independent.

Table 2 presents a general correlation between events (use of text keys, use of mouse etc.) and user activity, or task:

TABLE 2

| Task | Actual User Action | Sensor Detectors active |
| --- | --- | --- |
| Reading-only | Periodic scrolling | Motion speed Direction |
| Writing (text) | Typing | Text, control, mistake keys speed |
| Drawing | Mouse use | Motion, drag and clicks speed |
| Programming | Change of active window Typing | All keyboard or mouse speed Text, Control, Mistake keys |

When the mouse sensor detectors detect movement of the mouse (not shown), the direction and rate of use can be determined by monitoring mouse events associated with the mouse position co-ordinates. The co-ordinates of the pointer of the mouse are recorded by the detector and are passed to the corresponding frequency detector, which fits a line to the points indicating latest positions and a rate of change of positions of the pointer of the mouse.

The stress ranking and user activity information may be used to modify a user's work plan. The information may be input into the co-ordinator 305, or it may be fed directly to any one of the assistants, shown in FIG. 2. When the co-ordinator receives the information and if, for example, the user is manifesting high levels of stress, the co-ordinator may inhibit or modify plans that are currently being carried out in order to reduce the amount of information supplied to the user. However, if the user is sitting at the workstation and appears to be relaxed, the co-ordinator 18 may be configured to only provide a very low level of filtering of incoming emails and telephone calls in order to keep the user occupied. Similarly if the user is involved in a task that is coupled with non-interruptible status, the co-ordinator may restrict the amount of information supplied to the user to enable him to continue without interruptions. Typically, filtering such as described above may be controlled by thresholds set within the co-ordinator, and these thresholds may be a function both of the information to be passed on by the co-ordinator and of the assistant to which the information is directed.

If the stress ranking information is sent directly into one of the assistants, for example into the email or telephone assistant, the assistant itself will have thresholds set which are solely a function of the assistant.

Implementation

For the multi-modal interface 209 applications described above, each of the monitoring means 3001, 3003, 3005, 3007 and corresponding sensor, frequency and time-out detectors may be written in Java to enable concurrent monitoring and gathering of data, although use of Java is inessential. Any language that facilitates simultaneous operation of the monitoring means, frequency detectors, and time-out detectors may be used. Thus information from each of the monitoring means may be integrated in real-time and analysed to determine the user's task. For example, the time-out detectors may poll for a signal every few seconds, and this information may be cross-referenced with frequency detector information and time-out detectors from other monitoring means to determine whether the user is reading or thinking. This information may also be used to determine whether the user is tired, which may indicate the stress of the user as described above.

Each Sensor detector is based on a Java events listener, which is written using Java 1.1 event model. When a sensor detector handles an event, it tests whether this event corresponds to it or not. If the event is relevant to the sensor, the event and the date thereof is stored in the frequency detector, which is a Java object.

The frequency detector computes a speed of use of events either in an event-dependent way or in a time-dependent way and stores the timestamps of the events in a sorted-a object (sorted array) and a counter object. The sorted-a object is a tool that is used to compute statistics relating to speed from a set of events, and in the apparatus for identifying user activities at a workstation is implemented to compute the median of the stored speed of events. The counter object computes and stores a speed of use of an event on a longer period of time, so as to provide the time-dependent information.

The time-out detector is a Java object that stores occurrences of events over a time scale that is suitable for detecting long periods of inactivity.

The imaging device described in the first embodiment may be a gaze tracker, which is a device that monitors eyeball movement of the user. The direction of gaze of the user can be determined and the user can use this feature by directing his/her gaze to a particular part of the display 103 in order for instance to select data for data processing operations. One example of a gaze tracker is described in U.S. Pat. No. 4,836,670. Known gaze trackers consist of a TV camera directed towards the eye of the user together with pattern recognition software running on the computer, which analyses the image developed by the camera in order to determine the direction of view of the user. This is correlated with the configuration of a display being viewed by the user so as to determine which window or region of the display is being viewed by the user. The imaging device may alternatively be a camera suitable for use in videoconferences and which is capable of providing around 15 frames of image per second. Changes in the camera view may be observed by calculating the difference between neighbouring frames in corresponding pixel positions to output inter-frame temporal information such as is shown in FIG. 26.

Many modifications and variations fall within the scope of the invention, which is intended to cover all permutations and combinations of the individual modes of operation of the various assistants described herein.

As will be understood by those skilled in the art, the invention described above may be embodied in one or more computer programs. These programmes can be contained on various transmission and/or storage mediums such as a floppy disc, CD-ROM, or magnetic tape so that the programmes can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. Apparatus for processing communications received by a user over a communications link, which communications include identification information, the apparatus comprising:
   (i) an input for receiving communications;
   (ii) extracting means for extracting identification information associated with a communication received at the input;
   (iii) categorizing means for categorizing the received communication based on the extracted identification information and recommending an action based on the categorization;
   (iv) means for monitoring user response to the communication and operable to measure the time taken for the user to review and/or respond to a communication;
   (v) modifying means for modifying the categorization of the categorizing means in accordance with a monitored user response to the communication,
   wherein, in response to receipt of a subsequent communication having identification information matching that of the earlier communication, the apparatus is operable to recommend an action based on the modified categorization.

2. Apparatus as in claim 1, wherein the extracting means includes comparing means for comparing the extracted identification information with a plurality of predetermined identification information types so as to determine a match between one of the plurality of predetermined identification types and the extracted identification information.

3. Apparatus as in claim 2, wherein the extracting means utilizes fuzzy logic to determine said match.

4. Apparatus as in claim 1, wherein the communications is either one of an email or a telephone call.

5. Apparatus as in claim 4, wherein the identification information includes at least one of:
   (a) a subject of the email;
   (b) an address of a sender of the email;
   (c) a recipient list of the email/ and/or (d) a calling line identifier.

6. Apparatus as in claim 2, wherein the comparing means is operable to compare any or all of:
   (a) a sender with a predetermined list of senders;
   (b) a recipient list with a predetermined list of recipients;
   (c) a subject with a predetermined list of subjects; and/or
   (d) a calling line identifier with a predetermined list of numbers.

7. Apparatus as in claim 1 wherein the categorizing means includes a Bayes net, which Bayes net is operable to output an array of values indicative of a priority status for the first communication based on inputs indicative of the extracted identification information and the time taken for the user to review the communication.

8. Apparatus as in claim 1, further comprising means for automatic message transmission, such that when a communication is received from a sender that has been identified for automatic message transmission, a predetermined message is automatically returned in response to the communication.

9. Apparatus as in claim 1 further comprising a diary for logging user availability, said categorizing means being triggered by a received communication to review a user's availability and to base a recommended response with respect to the received communication at least in part on said user availability.

10. Apparatus as in claim 1 further comprising means for storing user inputs with respect to extracted identification information.

11. Apparatus as in claim 9 wherein, in the case of at least one form of availability status, or where the stored identification information has been flagged by a user input accordingly, the apparatus triggers the recommended response of the categorizing means without receiving user input.

12. A method of processing communications received by a user over a network, which communications include identification information, the method comprising:
   (i) extracting the identification information from a communication
   (ii) categorizing the communication based on the extracted identification information;
   (iii) observing time taken for the user to respond to the communication;
   (iv) modifying the categorization associated with the extracted identification information in accordance with the observed time taken for response; and
   (v) upon receipt of a subsequent communication having identical identifying information to that of an earlier communication, recommending a user action based on the modified categorization.

13. A computer program comprising a set of instructions to cause a computer to perform the method defined in claim 12.

14. A computer program as in claim 13 placed on a carrier, which carrier includes any one of:
   (i) a CD-ROM storage medium;
   (ii) a hard disk drive storage medium;
   (iii) a 3.5 inch diskette storage medium;
   (iv) a protectively-encased tape cartridge storage medium;
   (v) a zip drive disk storage medium;
   (vi) a jazz drive diskette storage medium;
   (vii) an optical disk storage medium;
   (viii) auxiliary storage memory.

15. A method as in claim 12 including the step of storing the observed time taken as a function of the extracted identification information.

16. A method as in claim 15 in which said categorizing step (ii) includes:
   (a) for at least one of the extracted identification information, retrieving stored time data associated therewith;
   (b) operating the categorizing means in accordance with the extracted identification information and with the retrieved time data;
   (c) examining an output from the categorizing means, which output includes a plurality of response identifiers corresponding to times for response; and
   (d) extracting a response identifier corresponding to the highest value in said output.

17. A method as in claim 16 in which the categorizing means includes two Bayes nets, a first of which categorizes in accordance with the extracted identification information and a second of which categorizes in accordance with the retrieved time data, such that the operating step (b) comprises operating each of the first and second categorizing means and combining outputs therefrom.

18. A method as in claim 17 in which said step (iv) of modifying the categorization associated with the extracted identification information includes modifying each of the first and second Bayes nets in accordance with the observed time.

19. A storage medium containing digital data, comprising computer executable code for loading into a computer for the performance of the method of claim 12.

* * * * *